US012565270B2

(12) United States Patent
Nishimura et al.

(10) Patent No.: US 12,565,270 B2
(45) Date of Patent: Mar. 3, 2026

(54) VEHICLE-BODY FRONT STRUCTURE INCLUDING A REINFORCEMENT STRUCTURE THAT COUPLES A MOTOR ARRANGEMENT PORTION AND A CROSS STRUCTURE TOGETHER

(71) Applicant: Mazda Motor Corporation, Hiroshima (JP)

(72) Inventors: Yoshikazu Nishimura, Hiroshima (JP); Yasuaki Setoh, Hiroshima (JP); Taiki Yotsuyanagi, Hiroshima (JP); Takayuki Kimura, Hiroshima (JP); Yoshihiro Miyamoto, Hiroshima (JP); Akiko Kawamoto, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 456 days.

(21) Appl. No.: 18/108,017

(22) Filed: Feb. 10, 2023

(65) Prior Publication Data

US 2023/0264756 A1      Aug. 24, 2023

Related U.S. Application Data

(60) Provisional application No. 63/444,377, filed on Feb. 9, 2023.

(30) Foreign Application Priority Data

Feb. 24, 2022    (JP) ................................. 2022-026759
Feb. 24, 2022    (JP) ................................. 2022-026760

(Continued)

(51) Int. Cl.
B62D 25/08          (2006.01)
B60K 1/00           (2006.01)

(Continued)

(52) U.S. Cl.
CPC .............. B62D 25/085 (2013.01); B60K 1/00 (2013.01); B60K 1/04 (2013.01); B60L 50/60 (2019.02);

(Continued)

(58) Field of Classification Search
CPC .... B62D 25/085; B62D 25/081; B62D 25/20; B62D 25/082; B62D 25/14; B62D 25/16;

(Continued)

(56) References Cited

U.S. PATENT DOCUMENTS 5,501,289 A * 3/1996 Nishikawa ............... B60K 1/04
                                                    280/783
8,336,658 B2 * 12/2012 Rawlinson ............... B60K 1/04
                                                    429/96

(Continued)

FOREIGN PATENT DOCUMENTS

EP          3738864 A1    11/2020
JP      2011240762 A    12/2011

(Continued)

OTHER PUBLICATIONS

Extended European search report issued on Jul. 19, 2023, in corresponding European patent Application No. 23157191.0, 9 pages.

*Primary Examiner* — James M Dolak
(74) *Attorney, Agent, or Firm* — XSENSUS LLP

(57)          ABSTRACT

A vehicle-front body structure includes a partition wall portion which demarcates a vehicle cabin inside space, a motor arrangement portion which is formed by causing a part of the partition wall portion to bulge to an inside of a vehicle cabin and in which at least a part of a traveling motor is capable of being arranged, a cross member which is fixed to a floor panel on a vehicle rear side of the motor arrangement portion and extends in a vehicle width direction, and (Continued)

a reinforcement member which couples the motor arrangement portion and the cross member together.

16 Claims, 15 Drawing Sheets

(30) Foreign Application Priority Data

| Feb. 24, 2022 | (JP) | ................................. | 2022-026762 |
| Feb. 24, 2022 | (JP) | ................................. | 2022-026764 |
| Feb. 24, 2022 | (JP) | ................................. | 2022-026766 |

(51) Int. Cl.

| *B60K 1/04* | (2019.01) |
| *B60L 50/60* | (2019.01) |
| *B60N 2/015* | (2006.01) |
| *B62D 25/14* | (2006.01) |
| *B62D 25/20* | (2006.01) |
| *B62D 25/16* | (2006.01) |

(52) U.S. Cl.
CPC ........... *B60N 2/015* (2013.01); *B62D 25/081* (2013.01); *B62D 25/082* (2013.01); *B62D 25/14* (2013.01); *B62D 25/2018* (2013.01); *B60K 2001/0438* (2013.01); *B62D 25/16* (2013.01); *B62D 25/2036* (2013.01)

(58) Field of Classification Search
CPC ................ B62D 25/2036; B62D 25/08; B62D 25/2018; B62D 21/152; B62D 21/15; B62D 24/00; B60N 2/015; B60N 2/005; B60N 2/00; B60L 50/60; B60L 50/50; B60L 50/00; B60K 1/04; B60K 1/00; B60K 2001/0416; B60K 2001/0438
See application file for complete search history.

(56) References Cited

U.S. PATENT DOCUMENTS

| 8,479,858 | B2 * | 7/2013 | Kodaira | ................. | B62D 21/17 |
| | | | | | 180/68.5 |
| 8,668,248 | B2 * | 3/2014 | Ishizono | ............. | B62D 25/025 |
| | | | | | 296/70 |
| 8,733,487 | B2 * | 5/2014 | Usami | .................... | B62D 21/11 |
| | | | | | 180/68.5 |
| 9,259,998 | B1 * | 2/2016 | Leanza | ................. | B62D 25/20 |
| 10,112,470 | B2 * | 10/2018 | Hamilton | .............. | B62D 25/20 |
| 10,131,381 | B2 * | 11/2018 | Ashraf | ............... | B62D 63/025 |
| 10,421,345 | B2 * | 9/2019 | Kerspe | ..................... | B60P 3/20 |
| 10,589,790 | B2 * | 3/2020 | Ayukawa | ............ | B62D 21/152 |
| 10,632,827 | B2 * | 4/2020 | Ajisaka | .................. | B62D 25/08 |
| 10,688,856 | B2 * | 6/2020 | Kasai | ........................ | B60K 1/04 |
| 10,780,923 | B2 * | 9/2020 | Caliskan | ............... | B60N 2/015 |
| 10,988,186 | B2 * | 4/2021 | Makowski | .............. | B60K 6/22 |
| 11,040,740 | B2 * | 6/2021 | Grottke | ............... | B62D 27/065 |
| 11,124,244 | B2 * | 9/2021 | Kim | ...................... | B62D 25/02 |
| 11,148,721 | B2 * | 10/2021 | Liu | ........................ | B62D 21/08 |
| 11,173,776 | B2 * | 11/2021 | Sasaki | ...................... | B60K 1/04 |
| 11,214,310 | B2 * | 1/2022 | Hong | .................. | B62D 25/025 |
| 11,220,298 | B2 * | 1/2022 | Matsuda | ................ | B62D 25/20 |
| 11,485,416 | B2 * | 11/2022 | Lian | .................. | B62D 25/2018 |
| 12,145,653 | B2 * | 11/2024 | Sotty | ............. | B62D 25/2045 |
| 12,246,777 | B2 * | 3/2025 | Tanaka | .................... | B60K 1/00 |
| 12,447,807 | B2 * | 10/2025 | Jeong | ................ | B62D 25/2036 |
| 12,448,047 | B2 * | 10/2025 | Oguri | .................... | B62D 21/15 |
| 12,479,514 | B2 * | 11/2025 | Kim | .................... | B62D 25/082 |
| 2012/0212009 | A1 | 8/2012 | Ishizono et al. | | |
| 2018/0065461 | A1 * | 3/2018 | Maier | .............. | B62D 25/2018 |
| 2019/0232773 | A1 | 8/2019 | Kasai et al. | | |
| 2021/0101464 | A1 * | 4/2021 | Matsushima | .......... | B60N 2/005 |

FOREIGN PATENT DOCUMENTS

| JP | 2018122749 | A | 8/2018 |
| JP | 2021-62676 | A | 4/2021 |
| WO | 2011/055695 | A1 | 5/2011 |
| WO | 2021/044233 | A1 | 3/2021 |

* cited by examiner

VEHICLE-BODY FRONT STRUCTURE INCLUDING A REINFORCEMENT STRUCTURE THAT COUPLES A MOTOR ARRANGEMENT PORTION AND A CROSS STRUCTURE TOGETHER

CROSS-REFERENCES TO RELATED APPLICATIONS

The present application claims priority to Provisional Ser. No. 63/444,377 filed on Feb. 9, 2023 which claims benefit of Japanese Patent Application 2022-026759, filed Feb. 24, 2022, Japanese Patent Application 2022-026760, filed Feb. 24, 2022, Japanese Patent Application 2022-026762, filed Feb. 24, 2022, Japanese Patent Application 2022-026764, filed Feb. 24, 2022, and Japanese Patent Application 2022-026766, filed Feb. 24, 2022, the entire contents of each of which are incorporated herein by reference.

BACKGROUND

Field

The present disclosure relates to a vehicle-body front structure for an electric vehicle, for example.

Description of the Related Art

For example, Patent Literature 1 discloses an electric vehicle in which batteries are installed below a floor panel. In a front portion of the floor panel of the vehicle in Patent Literature 1, a center member is provided which extends in a vehicle front-rear direction. In the center member, plural protruding portions which are protruded upward and extend in the vehicle front-rear direction and recess portions which are recessed downward among the protruding portions are formed.

CITATION LIST

Patent Literature

[Patent Literature 1] Japanese Patent Laid-Open No. 2021-62676

SUMMARY

Incidentally, because in a vehicle including an engine in related art, an engine and accessory components configuring an intake-and-exhaust system, and so forth are provided in an engine room, in a case where an impact load is exerted from front in a collision, the vehicle absorbs the impact load by deforming components in the engine room, front side frames, and so forth.

However, because in a case of an electric vehicle as in Patent Literature 1, accessory components are largely decreased compared to an engine, there is a concern that an impact load cannot sufficiently be absorbed.

The present disclosure has been made in consideration of such problems, and an object thereof is, in an electric vehicle, to inhibit retreat of a traveling motor into an inside of a vehicle cabin in a collision while disposing the traveling motor as close to a vehicle rear side as possible and thereby sufficiently securing a crash stroke in the collision in the front-rear direction.

Means for Solving the Problems

To achieve the above object, a first aspect of the present disclosure can be based on a vehicle-body front structure for an electric vehicle in which a traveling motor is installed in a vehicle front portion. The vehicle-body front structure includes: a partition wall portion which is provided to extend in a vehicle width direction in the vehicle front portion and demarcates a vehicle cabin inside space; a motor arrangement portion which is formed by causing a part of the partition wall portion to bulge to an inside of a vehicle cabin and in which at least a part of the traveling motor installed on an outside of the vehicle cabin inside space is capable of being arranged; a cross member which is fixed to a floor panel on a vehicle rear side of the motor arrangement portion and extends in the vehicle width direction; and a reinforcement member which couples the motor arrangement portion and the cross member together.

In this configuration, because the motor arrangement portion formed in the partition wall portion bulges to the inside of the vehicle cabin, it becomes possible to cause the traveling motor to be close to the vehicle rear side. Accordingly, a crash stroke in a collision is sufficiently secured in a front-rear direction.

Further, in a collision in which an impact load from front is exerted, an obstacle possibly enters a space in front of the partition wall portion, and the obstacle exerts a load in a retreating direction on the traveling motor. The traveling motor on which the load in the retreating direction is exerted pushes rearward the motor arrangement portion, but because the motor arrangement portion is coupled with the cross member with high rigidity by the reinforcement member, rearward deformation of the motor arrangement portion is inhibited. Accordingly, retreat of the traveling motor to the inside of the vehicle cabin is inhibited.

In a second aspect of the present disclosure, a battery which supplies electric power to the traveling motor may be arranged, below the floor panel, in vehicle rear of a front portion of the reinforcement member. In this configuration, an impact load in a collision is less likely to be exerted on the battery.

In a third aspect of the present disclosure, in a front view, at least a part of the traveling motor may be positioned so as to overlap with a front portion of the reinforcement member. In this configuration, when the traveling motor retreats, its load can certainly be received by the front portion of the reinforcement member and can be transmitted to the cross member.

In a fourth aspect of the present disclosure, a battery casing which is capable of housing a battery supplying electric power to the traveling motor may be disposed below the floor panel. A front-side battery frame which extends in the vehicle width direction can be provided in a front portion of the battery casing. In a front view, at least a part of the traveling motor may be positioned so as to overlap with at least a part of the front-side battery frame.

In this configuration, when the traveling motor retreats, its load can be received by the front-side battery frame and be dispersed to the battery casing.

In a fifth aspect of the present disclosure, a lower-side portion of the partition wall portion may be formed to be positioned further to vehicle rear toward a lower position. The traveling motor can be installed in the motor arrangement portion which is formed in the lower-side portion of the partition wall portion.

In this configuration, in a case where the center of gravity is intended to be positioned low by installing the traveling motor below the lower-side portion of the partition wall portion, a portion above the traveling motor can be used as the vehicle cabin inside space, and it becomes possible to enlarge the vehicle cabin inside space.

On the cross member according to a sixth aspect of the present disclosure, at least a part of a seat which is disposed in the vehicle cabin inside space can be mounted.

In this configuration, the seat can be mounted by using the cross member which inhibits retreat of the traveling motor. In other words, retreat of the traveling motor can be inhibited by using the cross member on which the seat is capable of being mounted.

Advantages

As described above, at least a part of a traveling motor is arranged in a motor arrangement portion which is formed by causing a part of a partition wall portion to bulge to an inside of a vehicle cabin, and the motor arrangement portion is coupled with a cross member of a floor panel by a reinforcement member. Accordingly, retreat of the traveling motor to the inside of the vehicle cabin in a collision can be inhibited while the traveling motor is disposed as close to a vehicle rear side as possible and a crash stroke in the collision is thereby sufficiently secured in a front-rear direction.

BRIEF DESCRIPTION OF THE DRAWINGS

The scope of the present disclosure is best understood from the following detailed description of exemplary embodiments when read in conjunction with the accompanying drawings.

FIG. 4 is a plan view which illustrates a front-side portion of the lower structure while enlarging that.

DETAILED DESCRIPTION

Non-limiting embodiments of the present disclosure will hereinafter be described in detail based on drawings. Note that the description of a preferable embodiments in the following is substantially only about examples and is not at all intended to restrict the present disclosure, applications thereof, or uses thereof.

Figure 1:
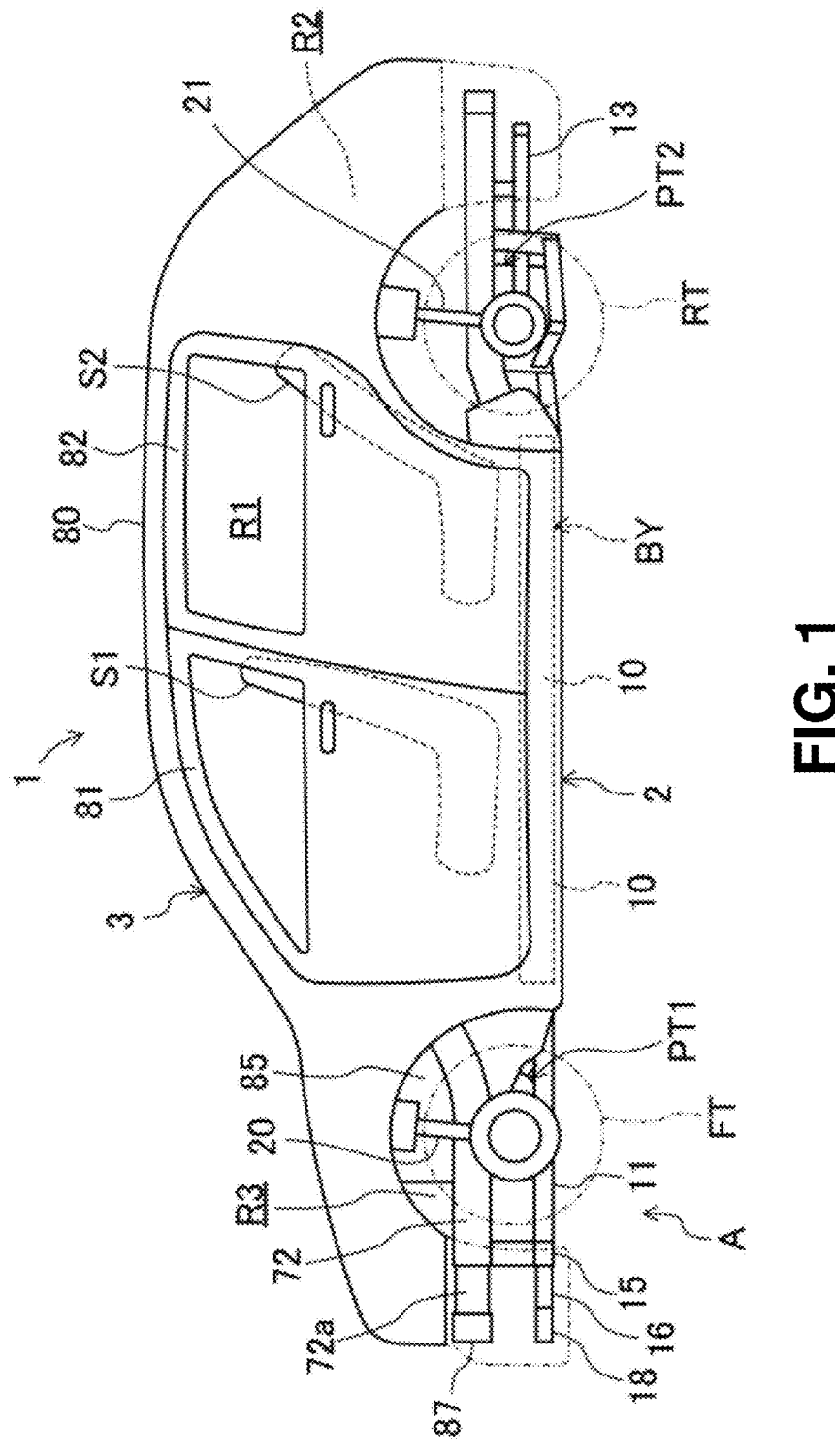
FIG. 1 is a side view of an electric vehicle according to an embodiment, in which a part of the electric vehicle is omitted.
Figure 2:
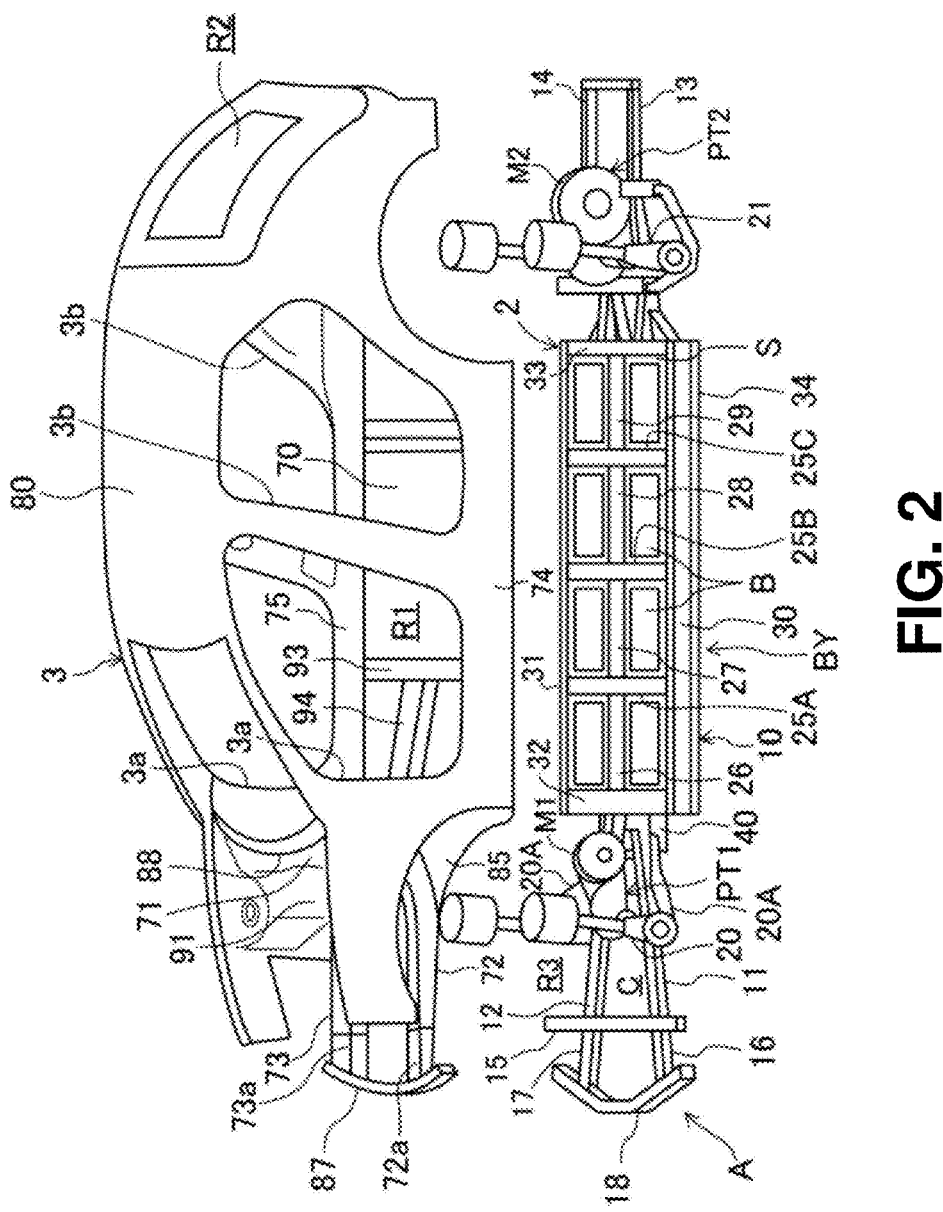
FIG. 2 is a side view illustrating a state where the electric vehicle is divided into a lower structure and an upper structure.

FIG. 1 is a left side view of an electric vehicle (electric automobile) 1 including a vehicle-body front structure A according to a non-limiting embodiment of the present disclosure. As illustrated in FIG. 2, the electric vehicle 1 includes a lower structure 2 and an upper structure 3. In FIG. 1, a front bumper, a rear bumper, front and rear wheels, and so forth are omitted and are illustrated by imaginary lines, and each portion is schematically illustrated. In FIG. 2, in addition to the components omitted in FIG. 1, doors, a bonnet hood, a front fender, window glass, front and rear lighting devices, interior materials, and so forth are omitted, and each portion is schematically illustrated.

Note that in the description of the embodiment, a vehicle front side will simply be referred to as "front", a vehicle rear side will simply be referred to as "rear", a vehicle right side will simply be referred to as "right", and a vehicle left side will simply be referred to as "left". A right-left direction of the vehicle is a vehicle width direction.

As illustrated in FIG. 1, the electric vehicle 1 is a passenger automobile. The electric vehicle 1 may be any of a sedan type, a hatch-back type, a minivan type, and so forth, and its shape is not particularly limited. As illustrated in FIG. 2, in the electric vehicle 1, a vehicle cabin R1 is formed which serves as a staying space (vehicle cabin inside space) for an occupant. As illustrated in FIG. 1, a front seat (seat) S1 is provided on a front side in the vehicle cabin R1, and a rear seat S2 is provided in rear of the front seat S1 in the vehicle cabin R1. In the rear of the rear seat S2, a trunk R2 is provided in accordance with necessity. The vehicle cabin R1 and the trunk R2 are provided to the upper structure 3. Note that in the vehicle cabin R1, only the front seat S1 may be provided, or a third row seat may be provided in the rear of the rear seat S2.

Figure 3:
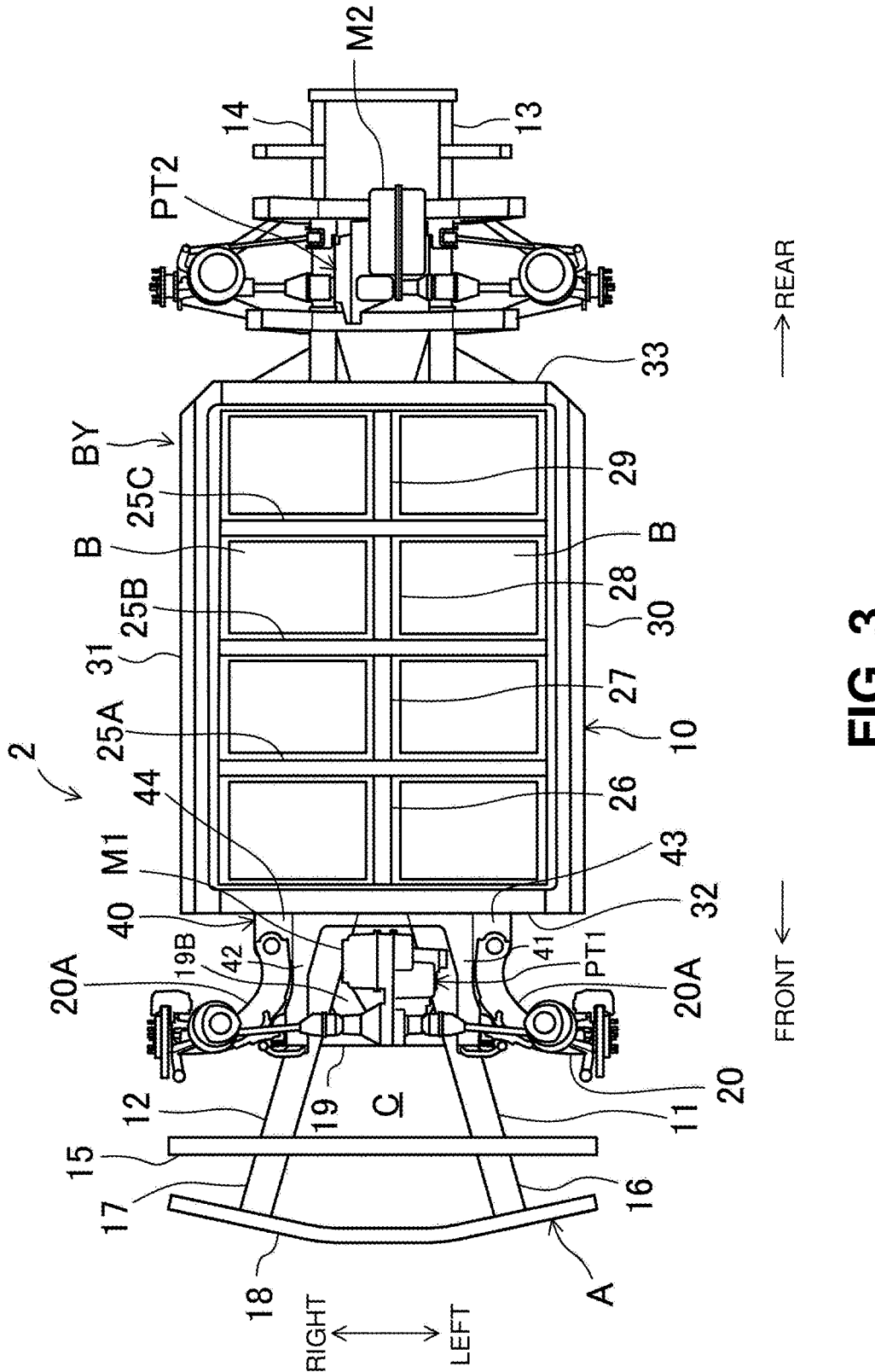
FIG. 3 is a plan view of the lower structure.
Figure 4:
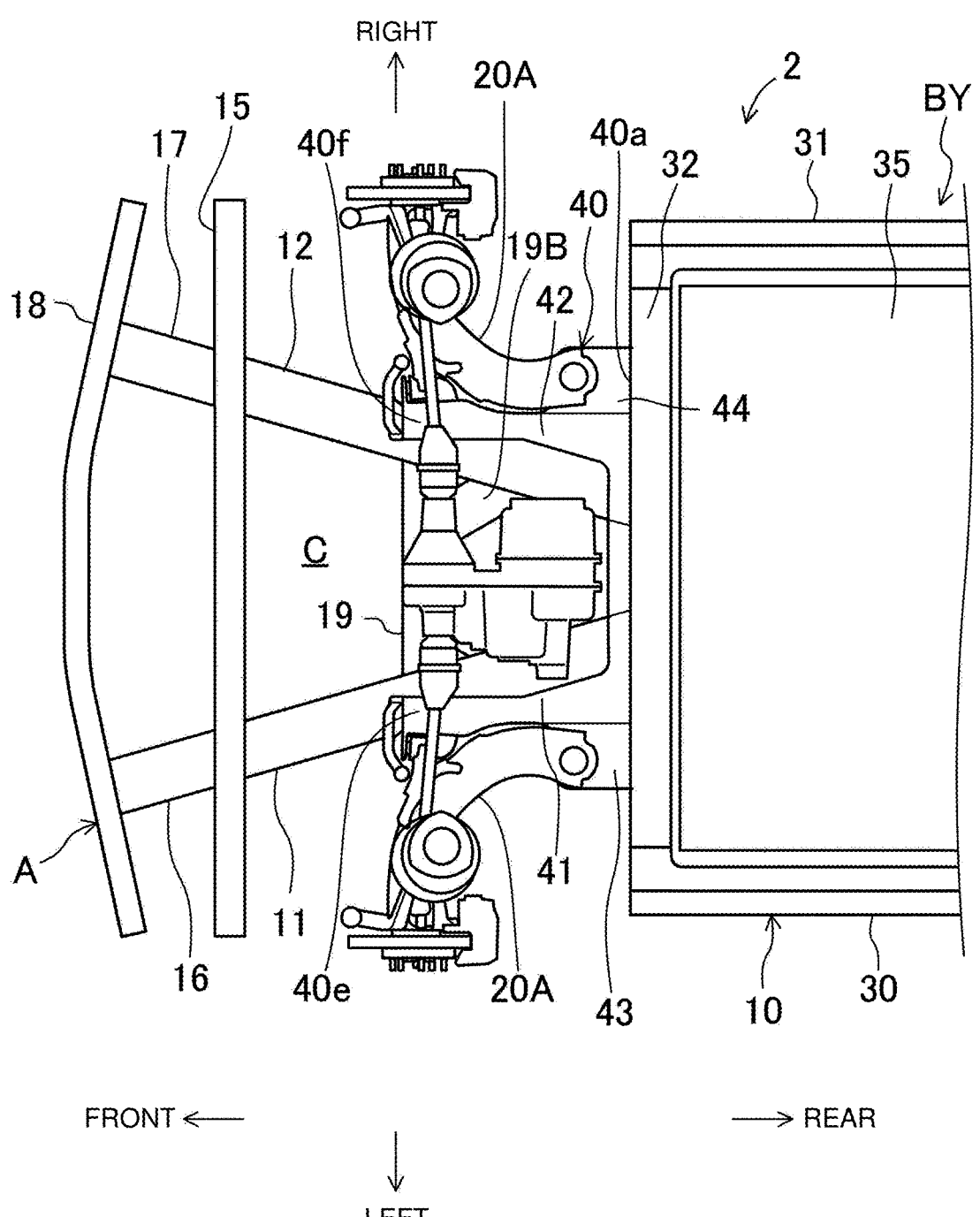
Figure 5:
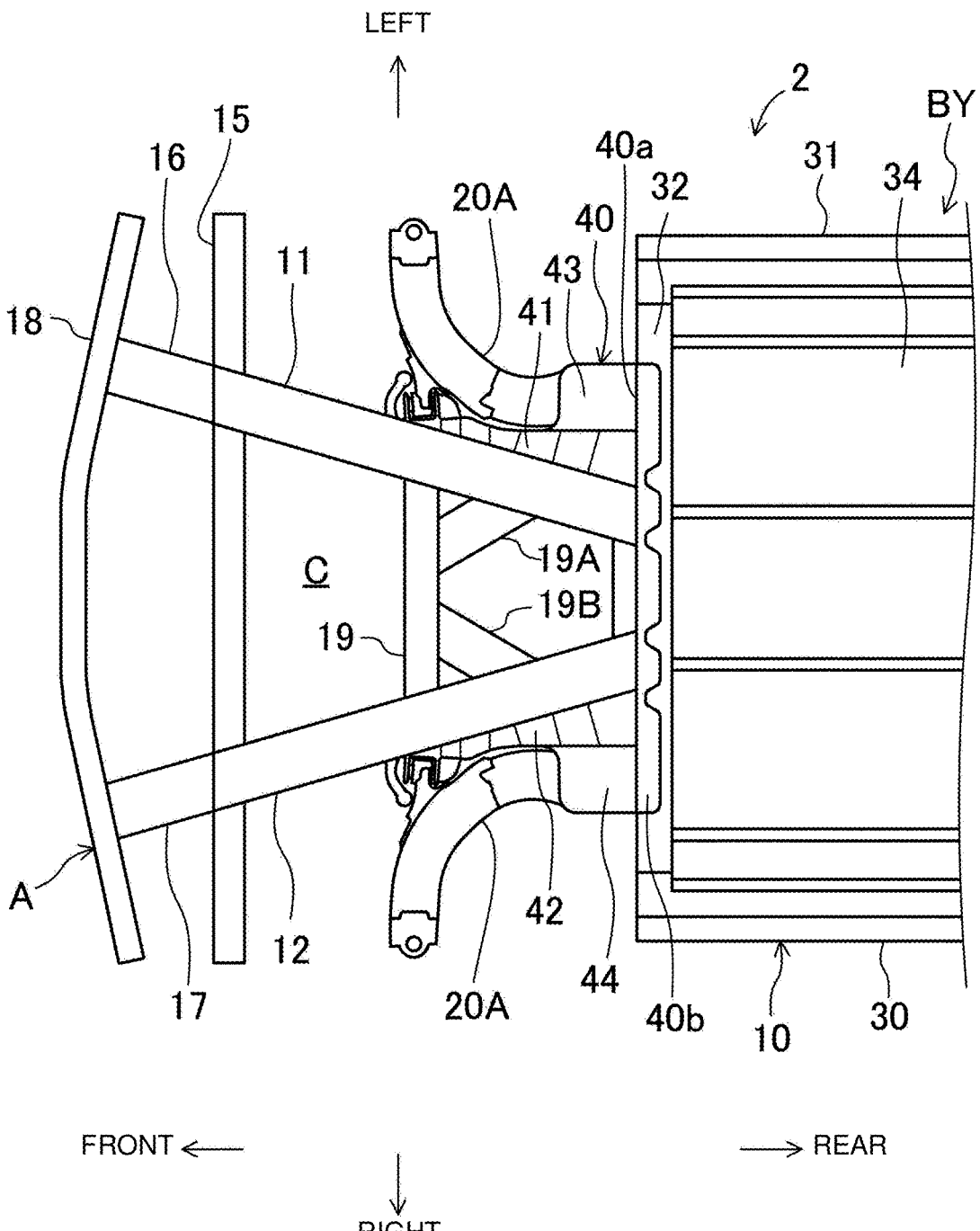
FIG. 5 is a bottom view which illustrates the front-side portion of the lower structure while enlarging that and from which a power train, shock absorbers, springs, and hubs, and so forth are omitted.

Meanwhile, a space (front-side space) in front of the vehicle cabin R1 as a front portion of the electric vehicle 1 can be set as a power chamber R3, for example. That is, as illustrated in FIG. 3, the vehicle-body front structure A is provided to the electric vehicle 1 which includes a front-side traveling motor M1 installed in a vehicle front portion, a rear-side traveling motor M2 installed in a vehicle rear portion, batteries B supplying electric power to the traveling motors M1 and M2, and a battery casing 10 housing the batteries B. The battery casing 10 is disposed below a floor panel 70 described later. FIG. 4 is a plan view of a front-side power train PT1 and its vicinity, and FIG. 5 is a bottom view in a case where the front-side power train PT1 is omitted.

The front-side traveling motor M1 produces a driving force for driving left and right front wheels FT, and the front-side power train PT1 is configured with only the front-side traveling motor M1 or with the front-side traveling motor M1, a speed reducer, a transmission, and so forth. Further, the rear-side traveling motor M2 illustrated in FIG. 2 and FIG. 3 produces a driving force for driving left and right rear wheels RT (illustrated in FIG. 1), and a rear-side power train PT2 is configured with only the rear-side traveling motor M2 or with the rear-side traveling motor M2, a speed reducer, a transmission, and so forth.

In the present embodiment, the rear-side traveling motor M2 is configured to produce a highest output (maximum torque) which is high compared to the front-side traveling motor M1, and the rear-side traveling motor M2 has a larger size than the front-side traveling motor M1. Accompanying that, the rear-side power train PT2 becomes larger than the front-side power train PT1. Note that the rear-side traveling motor M2 may produce the highest output which is low compared to the front-side traveling motor M1, or the rear-side traveling motor M2 and the front-side traveling motor M1 may produce equivalent highest outputs. Further, only the front-side power train PT1 may be provided, or only the rear-side power train PT2 may be provided. Further, for example, in a case of a large-sized vehicle, the front-side traveling motor M1 and the rear-side traveling motor M2 are installed which are large compared to a small-sized vehicle.

As illustrated in FIG. 2, the lower structure 2 includes the battery casing 10, a pair of left and right front side frames 11 and 12 which extend forward in front of the battery casing 10, and a pair of left and right rear frame 13 and 14 which extend rearward in the rear of the battery casing 10. A reference numeral 11 denotes the left front side frame, and a reference numeral 12 denotes the right front side frame. A reference numeral 13 denotes the left rear frame, and a reference numeral 14 denotes the right rear frame. In FIG. 2, a lid body 35 (described later) of the battery casing 10 is detached.

In a case of a common electric automobile, a battery casing is often formed as a separate body from a vehicle body and is often detachable from a portion below a floor; however, in the present embodiment, not only the battery casing 10 but also the left and right front side frames 11 and 12 and the left and right rear frames 13 and 14 are integrated with the battery casing 10, and the front side frames 11 and 12 and the rear frames 13 and 14 together with the battery casing 10 are detachable from the upper structure 3.

Specifically, the electric vehicle 1 of the present embodiment is configured to be capable of being divided, in an up-down direction, into the lower structure 2 having the battery casing 10 and the upper structure 3 forming the vehicle cabin R1 and the trunk R2. Being capable of being divided in the up-down direction means that without using welding, adhesion, or the like, the lower structure 2 is integrated with the upper structure 3 by using fastening members such as bolts, nuts, and screws. Accordingly, because the lower structure 2 can be separated from the upper structure 3 in accordance with necessity when maintenance or repairs are performed after the electric vehicle 1 is passed into the hands of a user, high maintainability is achieved. Note that fastening members used in the following description include bolts, nuts, screws, and so forth.

Here, as a vehicle-body structure of an automobile, a vehicle-body structure of a ladder frame type has been known. In a case of the vehicle-body structure of the ladder frame type, the vehicle-body structure is being capable of being divided, in the up-down direction, into a ladder frame and a cabin, but the ladder frame continuously extends in a front-rear direction and thus mainly receives a collision load in a front collision and a rear collision. In a side collision, the ladder frame only subsidiarily receives a collision load, and the collision load is mainly received by the cabin. As described above, in the vehicle-body structure of the ladder frame type, usually, different members receive collision loads between the front collision and rear collision and the side collision.

On the other hand, in a case of the electric vehicle 1 of the present embodiment, the lower structure 2 having the front side frames 11 and 12 and the rear frame 13 and 14 and the upper structure 3 are capable of being divided; however, a technical idea of the present embodiment is largely different from the vehicle-body structure of the ladder frame type in related art in the point that in both cases of the front collision and rear collision and the side collision, a collision load is received by the lower structure 2 and the upper structure 3, and the collision load is capable of being dispersedly absorbed by both of the structures 2 and 3. In the following, structures of the lower structure 2 and the upper structure 3 will be described in detail.

(Lower Structure)

First, the lower structure 2 will be described. The lower structure 2 includes the front and rear power trains PT1 and PT2, the front wheels FT, the rear wheels RT, front suspension apparatuses 20, rear suspension apparatuses 21, and so forth in addition to the battery casing 10, the front side frames 11 and 12, and the rear frames 13 and 14. Forms of the front suspension apparatus 20 and the rear suspension apparatus 21 are not particularly specified.

A battery unit BY is configured with the battery casing 10 and the batteries B housed in an internal portion of the battery casing 10, but in addition to those, for example, a battery cooling device and so forth may be included in the battery unit BY.

The battery casing 10 is a large casing which is formed, below the floor panel 70 of the upper structure 3, to be spanned from a left end portion vicinity to a right end portion vicinity of the floor panel 70 and to be spanned from a front end portion vicinity to a rear end portion vicinity of the floor panel 70. As described above, the battery casing 10 is disposed in a wide range of a lower region of the floor panel 70, and it thereby becomes possible to install the battery B with a large capacity in the electric vehicle 1. The battery B may be a lithium-ion battery, a solid-state battery, or the like or may be another secondary cell. Further, the battery B may be a so-called battery cell or may be a battery pack housing plural battery cells. In the present embodiment, the battery B is configured with a battery pack, and plural battery packs are installed in a state where those are aligned in the front-rear direction and the left-right direction.

The battery casing 10 includes a left-side battery frame 30, a right-side battery frame 31, a front-side battery frame 32, a rear-side battery frame 33, a bottom plate 34, and the lid body 35 (illustrated in FIG. 4) which covers the batteries B from above. Note that FIG. 3 illustrates a state where the lid body 35 is detached.

The left-side battery frame 30, the right-side battery frame 31, the front-side battery frame 32, and the rear-side battery frame 33 are configured with an extruded material or the like of an aluminum alloy, for example, but may be configured with an aluminum alloy plate material or a press-formed material of a steel plate as well. The bottom plate 34 can be configured with an extruded material. In the following description, "extruded material" denotes an extruded material of an aluminum alloy, and "press-formed material" denotes an aluminum alloy plate material or a press-formed material of a steel plate. Further, each member may be configured with a casting, for example.

All of cross-sectional shapes of the left-side battery frame 30, the right-side battery frame 31, the front-side battery frame 32, and the rear-side battery frame 33 in respective orthogonal directions to their longitudinal directions are rectangular shapes. Further, the left-side battery frame 30, the right-side battery frame 31, the front-side battery frame 32, and the rear-side battery frame 33 are all arranged at the same height and extend in generally horizontal directions.

The left-side battery frame 30 and the right-side battery frame 31 are outer-side battery frames which extend in the front-rear direction on vehicle-width-direction outer sides of the batteries B. The left-side battery frame 30 is provided to a left-side portion of the battery casing 10 and extends in the front-rear direction along a left side sill 74. The left-side battery frame 30 is fixed to the left side sill 74 by fastening members or the like. The right-side battery frame 31 is provided to a right-side portion of the battery casing 10 and extends in the front-rear direction along a right side sill 75. The right-side battery frame 31 is fixed to the right side sill 75 by fastening members or the like.

Further, the front-side battery frame 32 is provided to a front portion of the battery casing 10 and extends in the left-right direction. In a front view, at least a part of the front-side traveling motor M1 configuring the front-side power train PT1 is positioned so as to overlap with at least a part of the front-side battery frame 32, that is, an intermediate portion of the front-side battery frame 32 in the vehicle width direction. Further, the rear-side battery frame 33 is provided to a rear portion of the battery casing 10 and extends in the left-right direction.

A left end portion of the front-side battery frame 32 is connected with a front end portion of the left-side battery frame 30, and a right end portion of the front-side battery frame 32 is connected with a front end portion of the right-side battery frame 31. A left end portion of the rear-side battery frame 33 is connected with a rear end portion of the left-side battery frame 30, and a right end portion of the rear-side battery frame 33 is connected with a rear end portion of the right-side battery frame 31. Consequently, the left-side battery frame 30, the right-side battery frame 31, the front-side battery frame 32, and the rear-side battery frame 33 are members which configure a rack frame formed to surround all of the batteries B in a plan view.

The bottom plate 34 extends generally horizontally and is fixed to lower surfaces of the left-side battery frame 30, the right-side battery frame 31, the front-side battery frame 32, and the rear-side battery frame 33. Further, the lid body 35 is fixed to upper surfaces of the left-side battery frame 30, the right-side battery frame 31, the front-side battery frame 32, and the rear-side battery frame 33. In other words, the lid body 35 is mounted on the battery frames 30 to 33. When the lid body 35 is mounted on the battery frames 30 to 33, for example, fastening members may be used, or adhesion, welding, or the like may be used. Consequently, a battery housing space S housing the batteries B (illustrated in FIG. 2) is marked off and formed with the left-side battery frame 30, the right-side battery frame 31, the front-side battery frame 32, the rear-side battery frame 33, the bottom plate 34, and the lid body 35.

The size of the battery housing space S can be changed in accordance with the capacity of the installed batteries B. The size of the battery housing space S is capable of being easily changed by changing lengths of the left-side battery frame 30, the right-side battery frame 31, the front-side battery frame 32, and the rear-side battery frame 33 and a shape of the bottom plate 34. For example, in a case where the electric vehicle 1 is a small vehicle which has a short wheelbase and narrow treads, the left-side battery frame 30, the right-side battery frame 31, the front-side battery frame 32, the rear-side battery frame 33 are made short, the shapes of the bottom plate 34 and the lid body 35 are made small in response to the shortening, and the battery housing space S thereby becomes small in accordance with the small vehicle. On the other hand, in a case of a large vehicle, the left-side battery frame 30, the right-side battery frame 31, the front-side battery frame 32, and the rear-side battery frame 33 are made long, the shapes of the bottom plate 34 and the lid body 35 are made large in response to the elongation, and the battery housing space S thereby becomes large in accordance with the large vehicle. In a case where the left-side battery frame 30, the right-side battery frame 31, the front-side battery frame 32, and the rear-side battery frame 33 are configured with the extruded material, the lengths can easily be changed. Further, the bottom plate 34 can be configured with the extruded material, and its shape can thereby easily be changed.

An upper portion of the battery housing space S may be closed by the above lid body 35 or may be closed by the floor panel 70 of the upper structure 3. In the battery housing space S, other than the batteries B, a cooling device cooling the batteries B, a heating device heating the batteries B, and so forth (temperature adjustment devices) can also be provided. Further, electric power of the batteries B is supplied to the traveling motors M1 and M2 via a control device. In addition, it is possible to charge the batteries B via a charging socket, a contactless charger, or the like.

As illustrated in FIG. 2, in the internal portion of the battery casing 10 configuring the battery unit BY, as strength members extending in the left-right direction, first to third inside-casing members (inside-unit members) 25A, 25B, and 25C are provided. All of heights of the first to third inside-casing members 25A, 25B, and 25C are the same and are generally the same as the heights of the left-side battery frame 30 and so forth. The inside-casing members 25A, 25B, and 25C may be configured with extruded material or may be configured with press-formed material. In the present embodiment, three inside-casing members 25A, 25B, and 25C are provided, but the number of inside-casing members 25A, 25B, and 25C may be increased or decreased in accordance with the dimension of the battery casing 10 in the front-rear direction. The first to third inside-casing members 25A, 25B, and 25C are second members.

The first to third inside-casing members 25A, 25B, and 25C are arranged at distances from each other in the front-rear direction, the first inside-casing member 25A is in a foremost position, and the third inside-casing member 25C is in a rearmost position. A lower portion of each of the inside-casing members 25A, 25B, and 25C is fixed to an upper surface of the bottom plate 34. Further, a left end portion of each of the inside-casing members 25A, 25B, and 25C is fixed to an inner surface (right-side surface) of the left-side battery frame 30, and a right end portion of each of the inside-casing members 25A, 25B, and 25C is fixed to an inner surface (left-side surface) of the right-side battery frame 31. In other words, the inside-casing members 25A, 25B, and 25C are members which connect the left-side battery frame 30 and the right-side battery frame 31 together.

In the internal portion of the battery casing 10, as strength members extending in the front-rear direction, a front central member (inside-unit member) 26 and first to third rear central members (inside-unit members) 27 to 29 are provided. The front central member 26 and the first to third rear central members 27 to 29 are arranged at generally the same heights and are provided at a center of the battery casing 10 in the left-right direction. Lower end portions of the front central member 26 and the first to third rear central members 27 to 29 are mounted on the upper surface of the bottom plate 34. The front central member 26 and the first to third rear central members 27 to 29 are first members. The front central member 26 and first to third rear central members 27 to 29 and the first to third inside-casing members 25A, 25B, and 25C intersect with each other.

The front central member 26 is arranged between the front-side battery frame 32 and the first inside-casing member 25A, a front end portion of the front central member 26 is fixed to a central portion of the front-side battery frame 32 in the left-right direction, and a rear end portion of the front central member 26 is fixed to a central portion of the first inside-casing member 25A in the left-right direction. Consequently, the front-side battery frame 32 is a member which extends so as to connect the front end portions of the left-side battery frame 30 and the right-side battery frame 31 with the front end portion of the front central member 26.

The first rear central member 27 is arranged between the first inside-casing member 25A and the second inside-casing member 25B, a front end portion of the first rear central member 27 is fixed to the central portion of the first inside-casing member 25A in the left-right direction, and a rear end portion of the first rear central member 27 is fixed to a central portion of the second inside-casing member 25B in the left-right direction. Further, the second rear central member 28 is arranged between the second inside-casing member 25B and the third inside-casing member 25C, a front end portion of the second rear central member 28 is fixed to the central portion of the second inside-casing member 25B in the left-right direction, and a rear end portion of the second rear central member 28 is fixed to a central portion of the third inside-casing member 25C in the left-right direction. Further, the third rear central member 29 is arranged between the third inside-casing member 25C and the rear-side battery frame 33, a front end portion of the third rear central member 29 is fixed to the central portion of the third inside-casing member 25C in the left-right direction, and a rear end portion of the third rear central member 29 is fixed to a central portion of the rear-side battery frame 33 in the left-right direction. Consequently, because the first to third inside-casing members 25A, 25B, and 25C and the front central member 26 and first to third rear central members 27 to 29 are disposed in a lattice manner in the internal portion of the battery casing 10 and are coupled with each other, a reinforcement effect for the battery casing 10 is further enhanced.

When an imaginary straight line extending in the front-rear direction is presumed in a plan view, the positions of the front central member 26 and the first to third rear central members 27 to 29 in the left-right direction are set such that the positions are arranged on the imaginary straight line. In other words, the first to third rear central members 27 to 29 are provided to be positioned on a rearward imaginary extension line of the front central member 26. Note that the front central member 26 and the first to third rear central members 27 to 29 may be configured with one member which is continuous in the front-rear direction.

Figure 6:
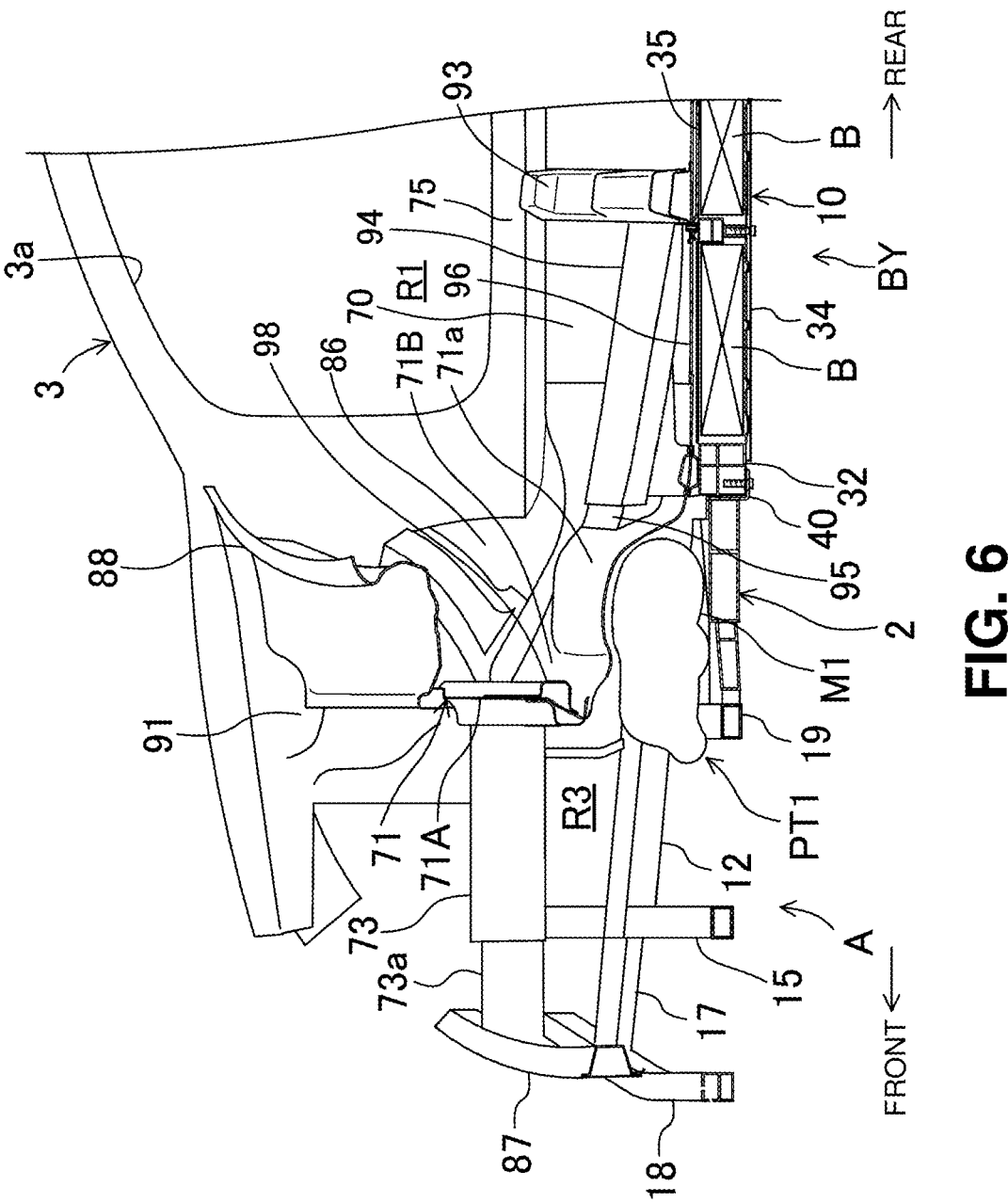
FIG. 6 is a cross-sectional perspective view illustrating a vehicle-body front portion.

As illustrated in FIGS. 4 to 6 and so forth, the vehicle-body front structure A includes the pair of left and right front side frames 11 and 12, a frame bracket 40, a first cross member 15, a pair of left and right impact absorption members 16 and 17, and a second cross member 19. In the present embodiment, in addition to the above members, the vehicle-body front structure A includes a front member 18, reinforcement members 19A and 19B, and so forth. Members configuring the vehicle-body front structure A are not limited to the above-described members and may include other members, apparatuses, devices, and so forth. Further, among the above-described members, members which do not serve as configuration elements required for the present disclosure may be omitted.

The front side frames 11 and 12 linearly and generally horizontally extend below left and right front main frames 72 and 73 provided to the upper structure 3. The front side frames 11 and 12 can be configured with the extruded material, the press-formed material, or the like, for example. In the present embodiment, because the front side frames 11 and 12 are configured with the extruded material, their cross-sectional shapes in a direction orthogonal to the front-rear direction are generally equivalent from front end portions to rear end portions.

The left and right front side frames 11 and 12 are mounted on the front-side battery frame 32 configuring the front portion of the battery casing 10 via the frame bracket 40. In other words, rear portions of the left and right front side frames 11 and 12 are coupled with the front-side battery frame 32 by the frame bracket 40. The frame bracket 40 is an integrally formed component of metal and extends in the left-right direction along a front surface of the front-side battery frame 32. The rear portions of the left and right front side frames 11 and 12 are fixed to the frame bracket 40. Metal which configures the frame bracket 40 is not particularly limited. For example, aluminum and so forth can be raised, and in this case, the frame bracket 40 can be formed by aluminum die-casting.

The left and right front side frames 11 and 12 are mounted on the front-side battery frame 32 via the frame bracket 40, but the rear portions of the front side frames 11 and 12 are caused to adjoin the front surface of the front-side battery frame 32. Consequently, the front side frames 11 and 12 extend forward from the front-side battery frame 32. Note that the rear portion of the front side frames 11 and 12 may slightly be spaced apart forward from the front surface of the front-side battery frame 32. In this case also, viewing those as the whole, it can be considered that the front side frames 11 and 12 extend forward from the front-side battery frame 32.

The rear portion of the left front side frame 11 is arranged to correspond to a section on a left side of a center of the front-side battery frame 32 in the left-right direction. Further, the rear portion of the right front side frame 12 is arranged to correspond to a section on a right side of the center of the front-side battery frame 32 in the left-right direction. Accordingly, a distance between the left and right front side frames 11 and 12 becomes a predetermined distance. A distance between the rear portions of the front side frames 11 and 12 is set narrower than a distance between the left-side battery frame 30 and the right-side battery frame 31 of the battery casing 10.

Heights of the left and right front side frames 11 and 12 are generally the same. Further, the left and right front side frames 11 and 12, the front central member 26 of the battery casing 10, the left-side battery frame 30, and the right-side battery frame 31 are disposed at generally the same heights.

The left and right front side frames 11 and 12 extend to be positioned on the vehicle-width-direction outer sides toward the front. That is, the left front side frame 11 is inclined with respect to the imaginary straight line extending in the front-rear direction of the vehicle in a plan view so as to be positioned on a left side toward the front. Further, the right front side frame 12 is inclined with respect to the imaginary straight line extending in the front-rear direction of the vehicle in a plan view so as to be positioned on a right side toward the front. Accordingly, the distance between the left and right front side frames 11 and 12 (a separation distance in the vehicle width direction) becomes wider toward the front, and in a portion between the left and right front side frames 11 and 12, a space C is formed in which all or a part of various components, apparatuses, devices, and so forth are capable of being arranged. Then, the space C has a shape which is enlarged in the vehicle width direction toward the front.

An inclination angle of the left front side frame 11 with respect to the above imaginary straight line is equivalent to an inclination angle of a right front side frame 12 with respect to the above imaginary straight line. A front portion of the left front side frame 11 is arranged on a vehicle-width-direction inner side of the left-side battery frame 30 of the battery casing 10. Further, a front portion of the right front side frame 12 is arranged on the vehicle-width-direction inner side of the right-side battery frame 31 of the battery casing 10.

Further, as illustrated in FIG. 1, positions, in the front-rear direction, of the front portions of the left and right front side frames 11 and 12 and of front portions of the left and right front main frames 72 and 73 of the upper structure 3 are set to generally the same positions.

As illustrated in FIG. 5, the frame bracket 40 includes a vertical plate portion 40a which extends in the vehicle width direction and the up-down direction along the front surface of the front-side battery frame 32 and a lower plate portion 40b which extends rearward from a lower edge portion of the vertical plate portion 40a along the lower surface of the front-side battery frame 32 and which extends also in the vehicle width direction. The vertical plate portion 40a and the lower plate portion 40b are fixed to the front-side battery frame 32 by fastening members or the like. In such a manner, the vertical plate portion 40a and the lower plate portion 40b of the frame bracket 40 are respectively fixed to the front surface and the lower surface of the front-side battery frame 32, and mounting rigidity of the frame bracket 40 on the front-side battery frame 32 can thereby be enhanced.

In the vertical plate portion 40a of the frame bracket 40, a left-side insertion hole into which the rear portion of the left front side frame 11 is inserted and a right-side insertion hole into which the rear portion of the right front side frame 12 is inserted are formed at a distance in the vehicle width direction. The rear portion of the left front side frame 11 is fixed to the frame bracket 40 by an adhesive, a fastening member, or the like, for example, in a state where the rear portion is inserted into the left-side insertion hole.

As illustrated in FIG. 4, the frame bracket 40 includes a left-side upper plate portion 40e which extends in the front-rear direction so as to cover an upper surface of the left front side frame 11 and a right-side upper plate portion 40f which extends in the front-rear direction so as to cover an upper surface of the right front side frame 12. The left-side upper plate portion 40e and the upper surface of the left front side frame 11 are caused to adhere to each other by an adhesive, for example, and the right-side upper plate portion 40f and the upper surface of the right front side frame 12 are similarly caused to adhere to each other. Accordingly, the left and right front side frames 11 and 12 can firmly be fixed to the frame bracket 40.

The frame bracket 40 has a left-side support portion 41 and a right-side support portion 42, and the left-side support portion 41 and the right-side support portion 42 are integrally shaped with the vertical plate portion 40a and the lower plate portion 40b. The left-side support portion 41 is a portion which is arranged on the vehicle-width-direction outer side (left side) of the left front side frame 11 and supports the above front side frame 11 from the vehicle-width-direction outer side. Specifically, the left-side support portion 41 is protruded forward from a left-side portion of the left-side insertion hole in the vertical plate portion 40a and extends along a left side surface of the left front side frame 11. A front portion of the left-side support portion 41 reaches the vicinity of a central portion of the left front side frame 11 in the front-rear direction, and it thus becomes possible to support a wide range of the left-side support portion 41 by the left-side support portion 41. It is also possible to cause the left front side frame 11 to adhere to the left-side support portion 41.

Further, the right-side support portion 42 is a portion which is arranged on the vehicle-width-direction outer side (right side) of the right front side frame 12 and supports the above front side frame 12 from the vehicle-width-direction outer side. Specifically, the right-side support portion 42 is protruded forward from a right-side portion of the right-side insertion hole in the vertical plate portion 40a and extends along a right side surface of the right front side frame 12. A front portion of the right-side support portion 42 reaches the vicinity of a central portion of the right front side frame 12 in the front-rear direction, and it thus becomes possible to support a wide range of the right-side support portion 42 by the right-side support portion 42. It is also possible to cause the right front side frame 12 to adhere to the right-side support portion 42.

On the vehicle-width-direction outer side of the frame bracket 40, left and right suspension arms 20A configuring the front suspension apparatuses 20 are supported to be swingable in the up-down direction. That is, in a portion on a left side of the left-side support portion 41 in the frame bracket 40, a left-side arm mounting portion 43 is provided to be protruded to a left side. On the left-side arm mounting portion 43, a base end portion of the left suspension arm 20A is mounted to be rotatable around a shaft extending in the front-rear direction. Further, in a portion on a right side of the right-side support portion 42 in the frame bracket 40, a right-side arm mounting portion 44 is provided to be protruded to a right side. On the right-side arm mounting portion 44, a base end portion of the right suspension arm 20A is mounted to be rotatable around a shaft extending in the front-rear direction.

The first cross member 15 is a member, which is suspended between a portion of the left front side frame 11 which is spaced apart forward from the front-side battery frame 32 and a portion of the right front side frame 12 which is spaced apart forward from the front-side battery frame 32, and linearly extends in the vehicle width direction. The first cross member 15 can also be configured with the extruded material, the press-formed member, or the like. In the present embodiment, a left-side portion of the first cross member 15 is fixed to the front portion of the left front side frame 11, and a right-side portion of the first cross member 15 is fixed to the front portion of the right front side frame 12. Consequently, the front portions of the left and right front side frames 11 and 12 are coupled with each other by the first cross member 15.

Further, the first cross member 15 is generally parallel with the front-side battery frame 32. Accordingly, in a plan view, a rectangular shape (a trapezoidal shape in the present example) is formed with the first cross member 15, the left and right front side frames 11 and 12, and the front-side battery frame 32, and a closed cross-section is configured when a horizontal cross-section is seen.

A left side of the first cross member 15 is protruded to the vehicle-width-direction outer side of the front portion of the left front side frame 11. Further, a right side of the first cross member 15 is protruded to the vehicle-width-direction outer side of the front portion of the right front side frame 12.

The second cross member 19 is a member, which is arranged between the first cross member 15 and the front-side battery frame 32 and is suspended between the left front side frame 11 and the right front side frame 12, and linearly extends in the vehicle width direction. The second cross member 19 can also be configured with the extruded material, the press-formed member, or the like. A dimension of the second cross member 19 in the vehicle width direction is shorter than a dimension of the first cross member 15 in the vehicle width direction.

As also illustrated in FIG. 5, a left end portion of the second cross member 19 is fixed to a right side surface of the left front side frame 11 by adhesion, welding, a fastening member, or the like. A right end portion of the second cross member 19 is similarly fixed to a left side surface of the right front side frame 12. Accordingly, intermediate portions of the left and right front side frames 11 and 12 in the front-rear direction are coupled with each other.

Further, the second cross member 19 is generally parallel with the front-side battery frame 32. Accordingly, in a plan view, a rectangular shape (a trapezoidal shape in the present example) is formed with the second cross member 19, the left and right front side frames 11 and 12, and the front-side battery frame 32, and a closed cross-section is configured when a horizontal cross-section is seen. Further, in a plan view, a rectangular shape is also formed with the second cross member 19, the left and right front side frames 11 and 12, and the first cross member 15.

As illustrated in FIG. 5, the left reinforcement member 19A extends rearward from a portion on a left side of a central portion of the second cross member 19 in the vehicle width direction to the front-side battery frame 32. A rear portion of the left reinforcement member 19A is fixed to the right side surface of the left front side frame 11. Further, the right reinforcement member 19B extends rearward from a portion on a right side of the central portion of the second cross member 19 in the vehicle width direction to the front-side battery frame 32. A rear portion of the right reinforcement member 19B is fixed to the left side surface of the right front side frame 12.

The left impact absorption member 16 is provided in front of the left front side frame 11 and is configured with a tubular member which extends forward. Further, the right impact absorption member 17 is provided in front of the right front side frame 12 and is configured with a tubular member which extends forward. Similarly to crush cans 72a and 73a of the upper structure 3, the impact absorption members 16 and 17 perform compressive deformation due to an impact load from the front in a phase previous to deformation of the front side frames 11 and 12 and thereby absorb the impact load. As illustrated in FIG. 1, positions, in the front-rear direction, of rear portions of the left and right impact absorption members 16 and 17 and of rear portions of the crush cans 72a and 73a of the upper structure 3 are set to generally the same positions.

The rear portion of the left impact absorption member 16 is fixed to the front portion of the left front side frame 11. A direction in which the left impact absorption member 16 extends is along the longitudinal direction of the left front side frame 11, and an axis line of the impact absorption member 16 is positioned on a forward extension line of the front side frame 11. Further, the rear portion of the right impact absorption member 17 is fixed to the front portion of the right front side frame 12. A direction in which the right impact absorption member 17 extends is along the longitudinal direction of the right front side frame 12, and an axis line of the impact absorption member 17 is positioned on a forward extension line of the front side frame 12.

As illustrated in FIG. 3, FIG. 4 and so forth, the front member 18 is a member which is suspended between the left and right impact absorption members 16 and 17. A portion on a left side of a central portion of the front member 18 in the vehicle width direction is fixed to a front portion of the left impact absorption member 16, and a portion on a right side of the central portion of the front member 18 in the vehicle width direction is fixed to a front portion of the right impact absorption member 17. Accordingly, the left and right impact absorption members 16 and 17 are coupled together by the front member 18. As illustrated in FIG. 1, positions, in the front-rear direction, of the front member 18 and of a front bumper reinforcement 87 of the upper structure 3 are set to generally the same positions, and the front member 18 is positioned directly below the front bumper reinforcement 87.

(Upper Structure)

Next, the upper structure 3 will be described. As illustrated in FIG. 2, the upper structure 3 includes the floor panel 70, a dash panel (partition wall portion) 71, the pair of left and right front main frames 72 and 73, and the pair of left and right side sills 74 and 75. A reference numeral 72 denotes the left front main frame, and a reference numeral 73 denotes the right front main frame. A reference numeral 74 denotes the left side sill, and a reference numeral 75 denotes the right side sill.

The floor panel 70 configures a floor surface of the vehicle cabin R1 and is formed with a steel plate or the like which extends in the front-rear direction and extends also in the left-right direction. A space above the floor panel 70 serves as the vehicle cabin R1. A roof 80 is provided to an upper portion of the vehicle cabin R1. Further, in both of left and right side portions of the upper structure 3, front openings 3a and rear openings 3b are formed. As illustrated in FIG. 1, the front opening 3a and the rear opening 3b are capable of being opened and closed by a front door 81 and a rear door 82, respectively. A front door and a rear door are disposed on a right side of the upper structure 3 to be capable of being opened and closed.

The left and right side sills 74 and 75 are respectively disposed in both of left and right end portions of the floor panel 70 to extend in the front-rear direction. The left end portion of the floor panel 70 is connected with an intermediate portion of the left side sill 74 in the up-down direction, and the right end portion of the floor panel 70 is connected with an intermediate portion of the right side sill 75 in the up-down direction. Upper-side portions of the side sills 74 and 75 are protruded upward from connection portions with the floor panel 70, and lower-side portions of the side sills 74 and 75 are protruded downward from the connection portions with the floor panel 70. Because the battery casing 10 is arranged below the floor panel 70, the battery casing 10 is arranged between the left and right side sills 74 and 75, and in a vehicle side view, the lower-side portions of the side sills 74 and 75 overlap with the battery casing 10. The battery casing 10 is fixed to the side sills 74 and 75.

The left and right front main frames 72 and 73 are disposed in a vehicle-body front portion and are highly strong members which extend in the front-rear direction. That is, the left and right front main frames 72 and 73 are positioned in front of the floor panel 70, are positioned above the floor panel 70, and are specifically disposed to extend forward from both of left and right sides in a lower portion of the dash panel 71.

The left and right front main frames 72 and 73 form a left-right symmetrical structure and can be configured by joining plural press-formed materials or can be configured with the extruded material, for example. A cross-section of each of the front main frames 72 and 73 in a direction orthogonal to the front-rear direction is set larger than a cross-section of each of the front side frames 11 and 12 of the lower structure 2 in the same direction. Accordingly, the front main frames 72 and 73 become thick and highly strong members compared to the front side frames 11 and 12.

Front end portions of the left and right front main frames 72 and 73 respectively have the crush cans 72a and 73a which perform compressive deformation in a front collision and absorb collision energy. The crush cans 72a and 73a are tubular members which extend in the front-rear direction. The crush cans 72a and 73a perform compressive deformation due to an impact load from the front in a phase previous to deformation of the front main frames 72 and 73 and thereby absorb the impact load. The front bumper reinforcement 87 extending in the left-right direction is fixed to front end portions of the left and right crush cans 72a and 73a.

Figure 7:
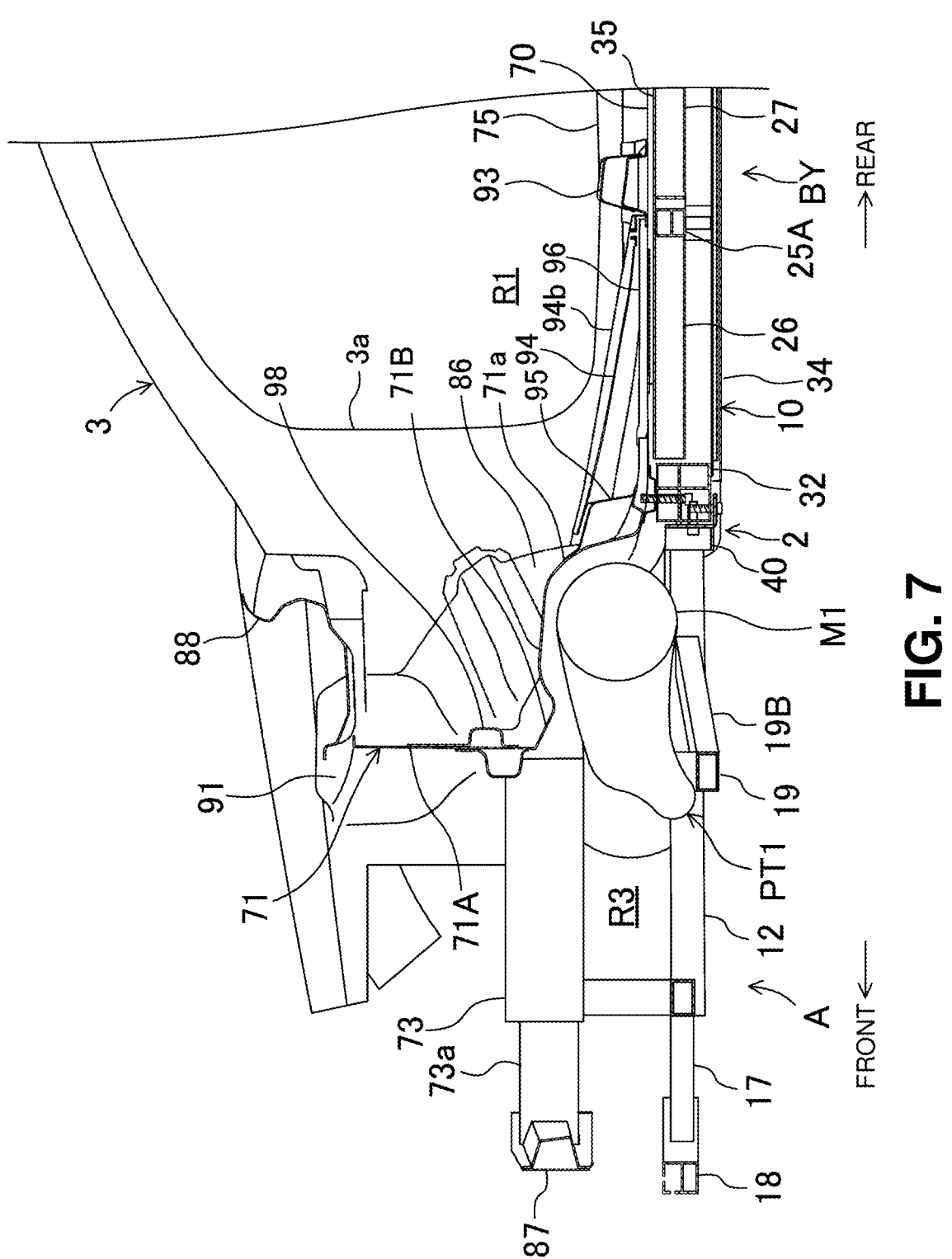
FIG. 7 is a cross-sectional view illustrating the vehicle-body front portion.
Figure 8:
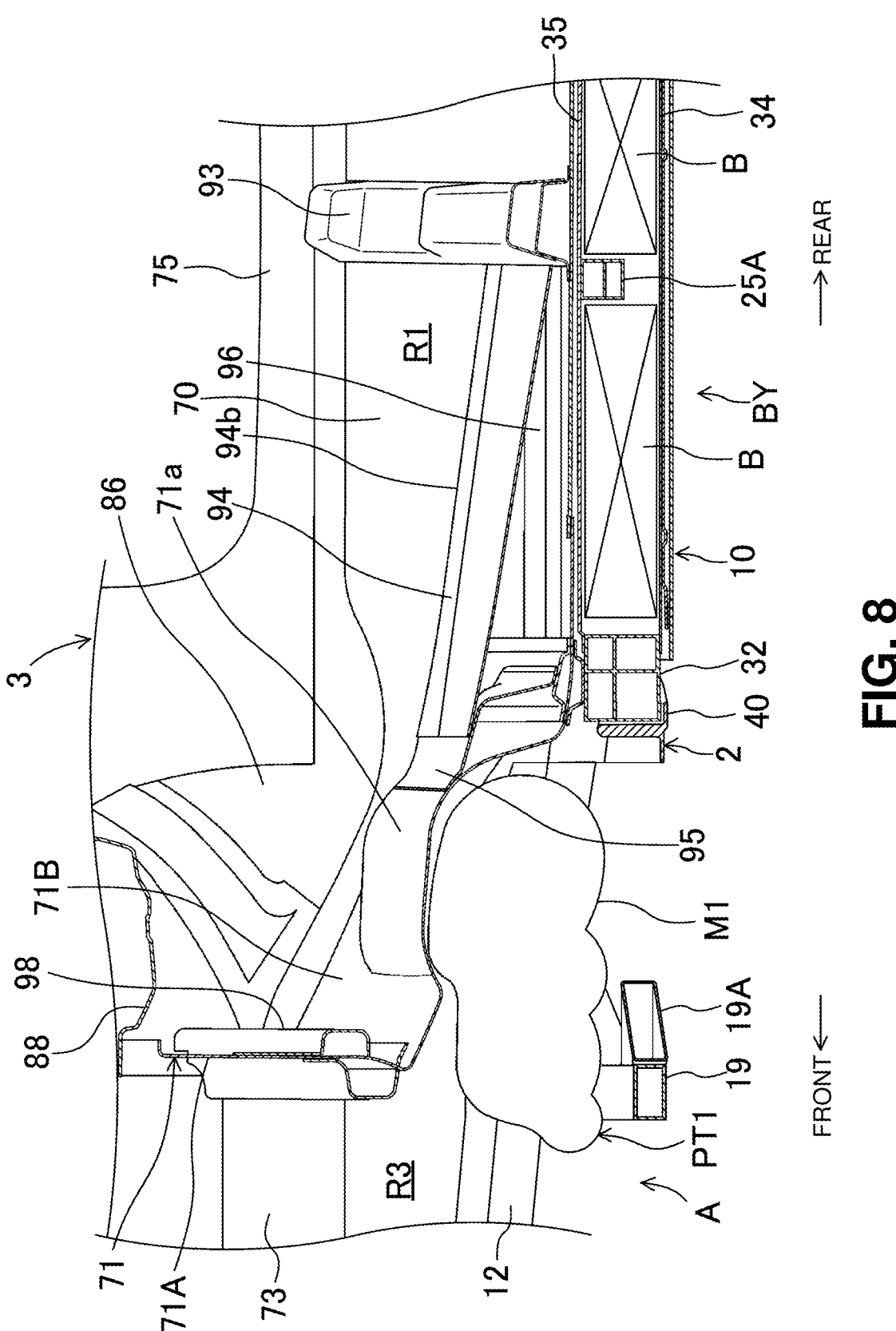
FIG. 8 is a cross-sectional view illustrating a front-side power train and its vicinity of the vehicle-body front portion while enlarging those.
Figure 9:
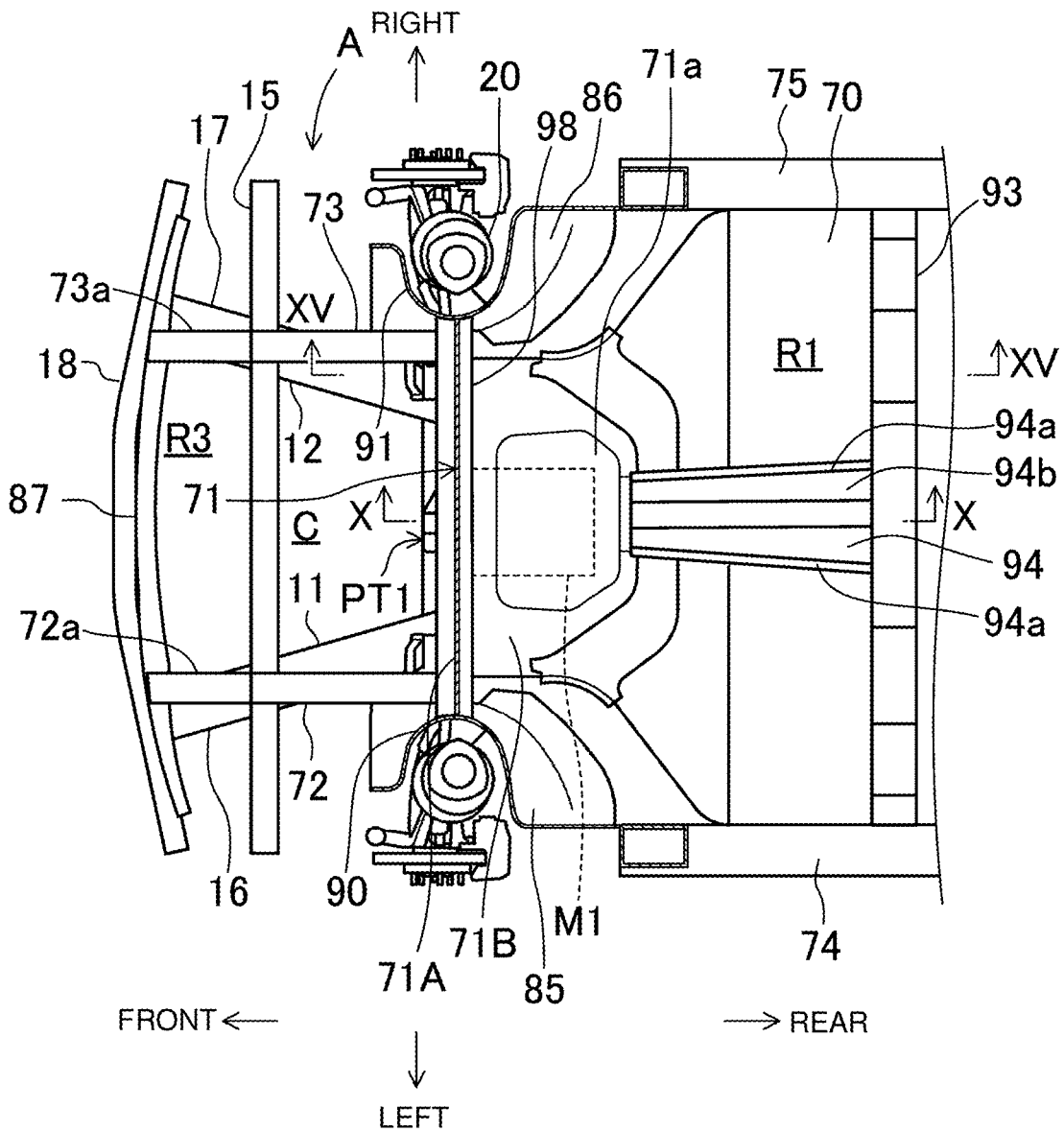
FIG. 9 is a cross-sectional view illustrating the vehicle-body front portion which is sectioned in a horizontal direction at an intermediate portion in an up-down direction.

As illustrated in FIG. 6 to FIG. 9, the dash panel 71 is a member for making off the vehicle cabin R1 from the power chamber R3, and the dash panel 71 can demarcate the vehicle cabin R1. The dash panel 71 is configured with a steel plate or the like, for example, extends in the left-right direction in the vehicle-body front portion, and extends also in the up-down direction. As illustrated in FIG. 9, a pair of left and right suspension tower portions 90 and 91 are provided on both of left and right sides of a front portion of the upper structure 3. A reference numeral 90 denotes the left suspension tower portion, and a reference numeral 91 denotes the right suspension tower portion.

Each of the left and right suspension tower portions 90 and 91 is formed to bulge inward in the vehicle width direction. That is, the left suspension tower portion 90 is formed to bulge rightward from left-side portions of the power chamber R3 and the vehicle cabin R1 in a range from the power chamber R3 to the vehicle cabin R1, its bulging range is set also in the up-down direction, and the left suspension tower portion 90 is capable of housing a part of the left front suspension apparatus 20 which will be described later and is provided to the lower structure 2. An upper portion (for example, a shock absorber upper portion) of the left front suspension apparatus 20 is supported by an upper portion of the left suspension tower portion 90. Further, the right suspension tower portion 91 is formed to bulge leftward from right-side portions of the power chamber R3 and the vehicle cabin R1 in a range from the power chamber R3 to the vehicle cabin R1, its bulging range is set also in the up-down direction, and the right suspension tower portion 91 is capable of housing a part of the right front suspension apparatus 20 which will be described later and is provided to the lower structure 2. An upper portion of the right front suspension apparatus 20 is supported by an upper portion of the right suspension tower portion 91.

As illustrated in FIG. 9, on both of left and right sides of the front portion of the upper structure 3, left and right front wheel wells 85 and 86 for housing the left and right front wheels FT are formed to bulge inward in the vehicle width direction. A reference numeral 85 denotes the left front wheel well, and a reference numeral 86 denotes the right front wheel well. The left front wheel well 85 is continuous with a rear side of the left suspension tower portion 90, bulges rightward from the left-side portion of the vehicle cabin R1, and is capable of housing the left front wheel FT. Further, the right front wheel well 86 is continuous with a rear side of the right suspension tower portion 91, bulges rightward from the right-side portion of the vehicle cabin R1, and is capable of housing the right front wheel FT.

As illustrated in FIG. 6 and FIG. 7, a cowl portion 88 is provided above the dash panel 71. The cowl portion 88 extends in the left-right direction from the upper portion of the left suspension tower portion 90 to the upper portion of the right suspension tower portion 91. Further, a lower-side portion of the cowl portion 88 extends forward and reaches intermediate portions of the left and right suspension tower portions 90 and 91 in the front-rear direction.

The dash panel 71 includes an upper-side panel portion (first partition wall portion) 71A configuring an upper-side portion of the dash panel 71 and a lower-side panel portion (second partition wall portion) 71B configuring a lower-side portion of the dash panel 71. The upper-side panel portion 71A and the lower-side panel portion 71B may be configured respectively with separate members or may be configured with different portions of one member. In a case where the upper-side panel portion 71A and the lower-side panel portion 71B are configured with separate members, those may each be shaped into desired shapes and thereafter be integrated together by joining those, or two members may be joined together and thereafter be shaped into desired shapes.

An upper end portion of the upper-side panel portion 71A is connected with the lower-side portion of the cowl portion 88. The upper-side panel portion 71A extends in the left-right direction and also in the up-down direction and specifically extends from the intermediate portion of the left suspension tower portion 90 in the front-rear direction to the intermediate portion of the right suspension tower portion 91 in the front-rear direction.

The upper end portion of the lower-side panel portion 71B is connected with a lower end portion of the upper-side panel portion 71A. Thus, the upper end portion of the lower-side panel portion 71B extends in the left-right direction from the intermediate portion of the left suspension tower portion 90 in the front-rear direction to the intermediate portion of the right suspension tower portion 91 in the front-rear direction. Meanwhile, a lower-side portion which is lower than the upper end portion of the lower-side panel portion 71B (hereinafter, referred to as a lower-side portion of the lower-side panel portion 71B) is formed to be positioned further to the rear toward a lower position. The lower-side portion of the lower-side panel portion 71B may be inclined or may be curved.

A lower end portion (rear end portion) of the lower-side panel portion 71B is connected with the front end portion of the floor panel 70. Both of left and right sides of the lower-side portion of the lower-side panel portion 71B are respectively connected with the left and right front wheel wells 85 and 86, extend rearward to reach the left and right side sills 74 and 75, and are respectively connected with the left and right side sills 74 and 75.

Figure 14:
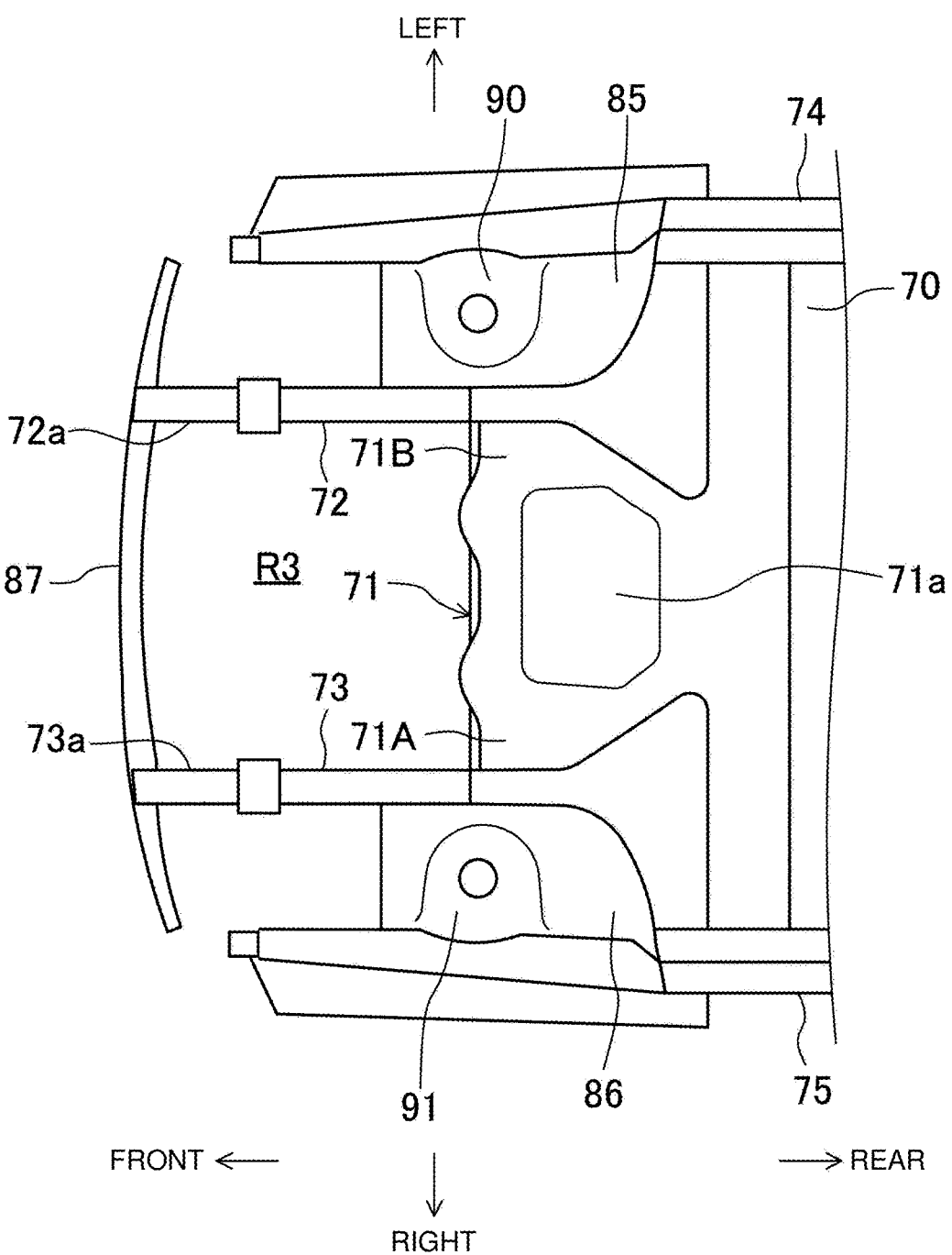
FIG. 14 is a bottom view of the vehicle-body front portion from which the power train, the battery unit, suspension apparatuses, and so forth are omitted.

As illustrated in FIG. 6 to FIG. 9, the front-side traveling motor M1 is installed below the lower-side portion of the lower-side panel portion 71B. In other words, the lower-side portion of the lower-side panel portion 71B is arranged to cover the front-side traveling motor M1 from above. As a configuration for making it possible to arrange the front-side traveling motor M1 below the lower-side portion of the lower-side panel portion 71B, the upper structure 3 includes the motor arrangement portion 71a. The motor arrangement portion 71a is a portion, in which at least a part of the front-side traveling motor M1 is capable of being arranged, and is a bulging portion, which is formed by causing the lower-side portion of the lower-side panel portion 71B to bulge to the inside of the vehicle cabin R1. FIG. 14 illustrates a state where the motor arrangement portion 71a is seen from below.

Specifically, the front-side traveling motor M1 is arranged to span from a portion between the left and right suspension tower portions 90 and 91 to a portion between the left and right front wheel wells 85 and 86 and is thus positioned directly below the lower-side portion of the lower-side panel portion 71B. The intermediate portion of the lower-side portion of the lower-side panel portion 71B in the vehicle width direction is caused to bulge upward such that at least an upper-side portion and a rear-side portion of the front-side traveling motor M1 are housed, and this bulging portion configures the motor arrangement portion 71a. Because a dimension of the motor arrangement portion 71a in the left-right direction is set shorter than a dimension between the left and right front wheel wells 85 and 86, both of left and right side areas of the motor arrangement portion 71a are configured with inclined surfaces which are inclined downward toward the rear. In other words, because the motor arrangement portion 71a is provided and it thereby becomes possible to cause the front-side traveling motor M1, that is, the front-side power train PT1 to be close to the vehicle rear side, a crash stroke in a head-on collision or the like is sufficiently secured in the front-rear direction.

In the motor arrangement portion 71a, the speed reducer and the transmission, which configure the front-side power train PT1, a casing which houses those, and so forth may be arranged. Further, in the motor arrangement portion 71a, a control device which controls the front-side traveling motor M1 and a wire harness may be arranged. When a surface of the motor arrangement portion 71a, which faces a lower side, is set as an inner surface of the motor arrangement portion 71a, as illustrated in FIG. 7, a gap is formed between the inner surface of the motor arrangement portion 71a and the front-side traveling motor M1, and the front-side traveling motor M1 does not contact with the inner surface of the motor arrangement portion 71a in usual traveling.

Figure 10:
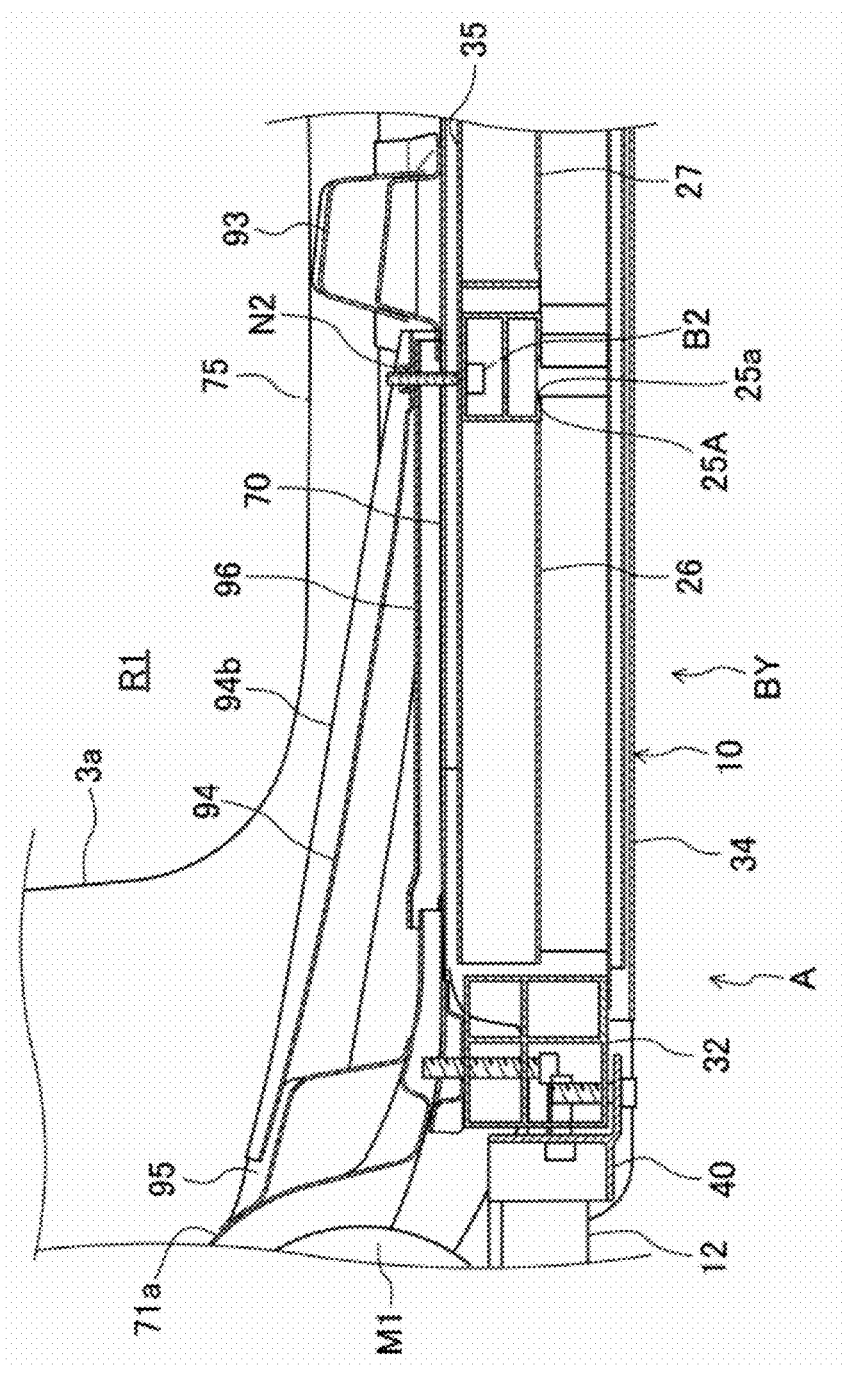
FIG. 10 is a cross-sectional view taken along line X-X in FIG. 9.

The upper structure 3 includes a front-side cross member 93 which is disposed in the vehicle cabin R1. The front-side cross member 93 is fixed to an upper surface of the floor panel 70 on a rear side of the motor arrangement portion 71a and extends in the vehicle width direction. The front-side cross member 93 is formed to be open downward, for example, this open portion is closed by joining the front-side cross member 93 to the upper surface of the floor panel 70, and a closed cross-section is thereby formed. A left end portion of the front-side cross member 93 is fixed to a right side surface of the left side sill 74, and a right end portion of the front-side cross member 93 is fixed to a left side surface of the right side sill 75. As illustrated in FIG. 10, an upper end portion of the front-side cross member 93 is arranged at an equivalent height to an upper end portion of the side sill 75.

A front portion of the left front seat S1 is mounted on a left side of a central portion of the front-side cross member 93 in the vehicle width direction, and a front portion of the right front seat S1 is mounted on a right side of the central portion of the front-side cross member 93 in the vehicle width direction. A slide rail or the like is provided to a lower portion of each of the front seats S1, and a front portion of the slide rail is fixed to the front-side cross member 93 via a bracket or the like. Note that a rear portion of the slide rail is fixed to the floor panel 70 on a rear side of the front-side cross member 93.

The upper structure 3 includes a reinforcement member 94 which couples the motor arrangement portion 71a and the front-side cross member 93 together. A rear portion of the reinforcement member 94 abuts, from front, a front surface of the front-side cross member 93, and when a rearward load is exerted on the reinforcement member 94, the front-side cross member 93 is capable of certainly receiving the load.

The reinforcement member 94 is a member which is arranged in a central portion in the vehicle width direction, supports the motor arrangement portion 71a from the rear, and thereby inhibits rearward deformation of the motor arrangement portion 71a. For example, when the front-side traveling motor M1 is caused to retreat due to an impact load from front and contacts with the motor arrangement portion 71a, the motor arrangement portion 71a is apt to deform rearward by receiving the impact load. In such a case, the reinforcement member 94 inhibits deformation of the motor arrangement portion 71a, and entrance of the front-side traveling motor M1 into the vehicle cabin R1 side is thereby inhibited. Further, in usual traveling other than a collision, the motor arrangement portion 71a is coupled with the highly strong front-side cross member 93, vehicle-body rigidity can thereby be improved, and the reinforcement member 94 contributes to an improvement in operation stability and so forth, for example.

The reinforcement member 94 is provided such that its longitudinal direction is directed in the front-rear direction. A dimension of the reinforcement member 94 in the front-rear direction is set longer than a dimension in the left-right direction. Further, a dimension of the reinforcement member 94 in the up-down direction is set shorter than the dimension in the left-right direction, and the reinforcement member 94 as a whole is in a flat shape. In the present embodiment, the reinforcement member 94 is configured with a press-formed component but is not limited to this and may be configured with extruded material, for example. As illustrated in FIG. 7 and so forth, a rib 94b extending in the front-rear direction is formed in the reinforcement member 94.

As illustrated in FIG. 10, a front portion of the reinforcement member 94 is fixed to the upper portion of the motor arrangement portion 71a. The reinforcement member 94 extends rearward from the upper portion of the motor arrangement portion 71a and is inclined to be positioned lower toward the rear. Thus, a space is formed between the reinforcement member 94 and the floor panel 70. Note that the reinforcement member 94 is fixed to a lower portion of the motor arrangement portion 71a, and in this case, the reinforcement member 94 can extend rearward along the upper surface of the floor panel 70 and can be fixed to the floor panel 70.

The upper structure 3 includes a floor reinforcement 96 which extends in the front-rear direction below the reinforcement member 94 and along the floor panel 70. The floor reinforcement 96 is fixed to the upper surface of the floor panel 70. A rear portion of the floor reinforcement 96 is connected with an intermediate portion of the front-side cross member 93 in the vehicle width direction.

Figure 11:
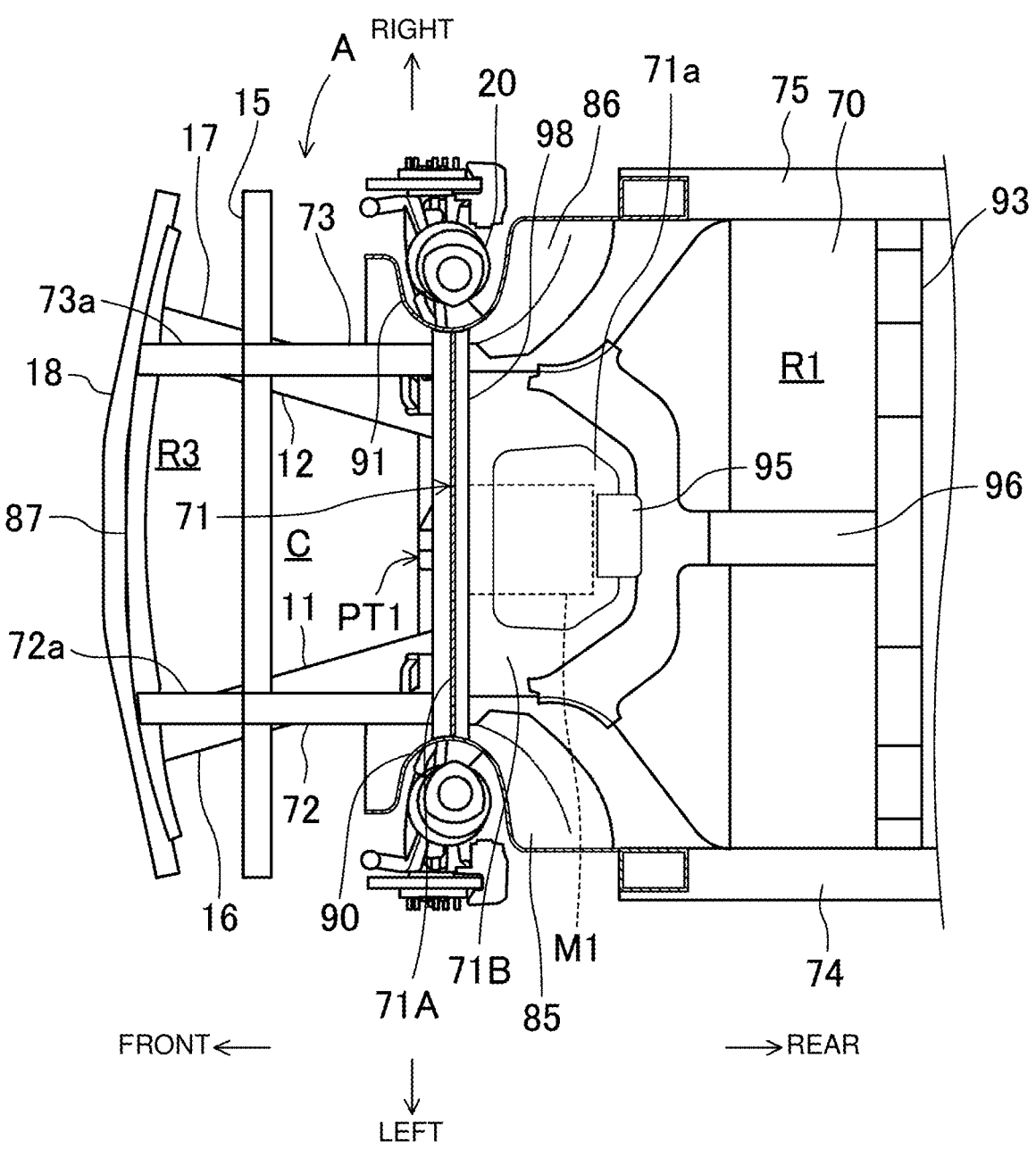
FIG. 11 is a diagram which corresponds to FIG. 9 and which illustrates a state where a reinforcement member is detached.
Figure 13:
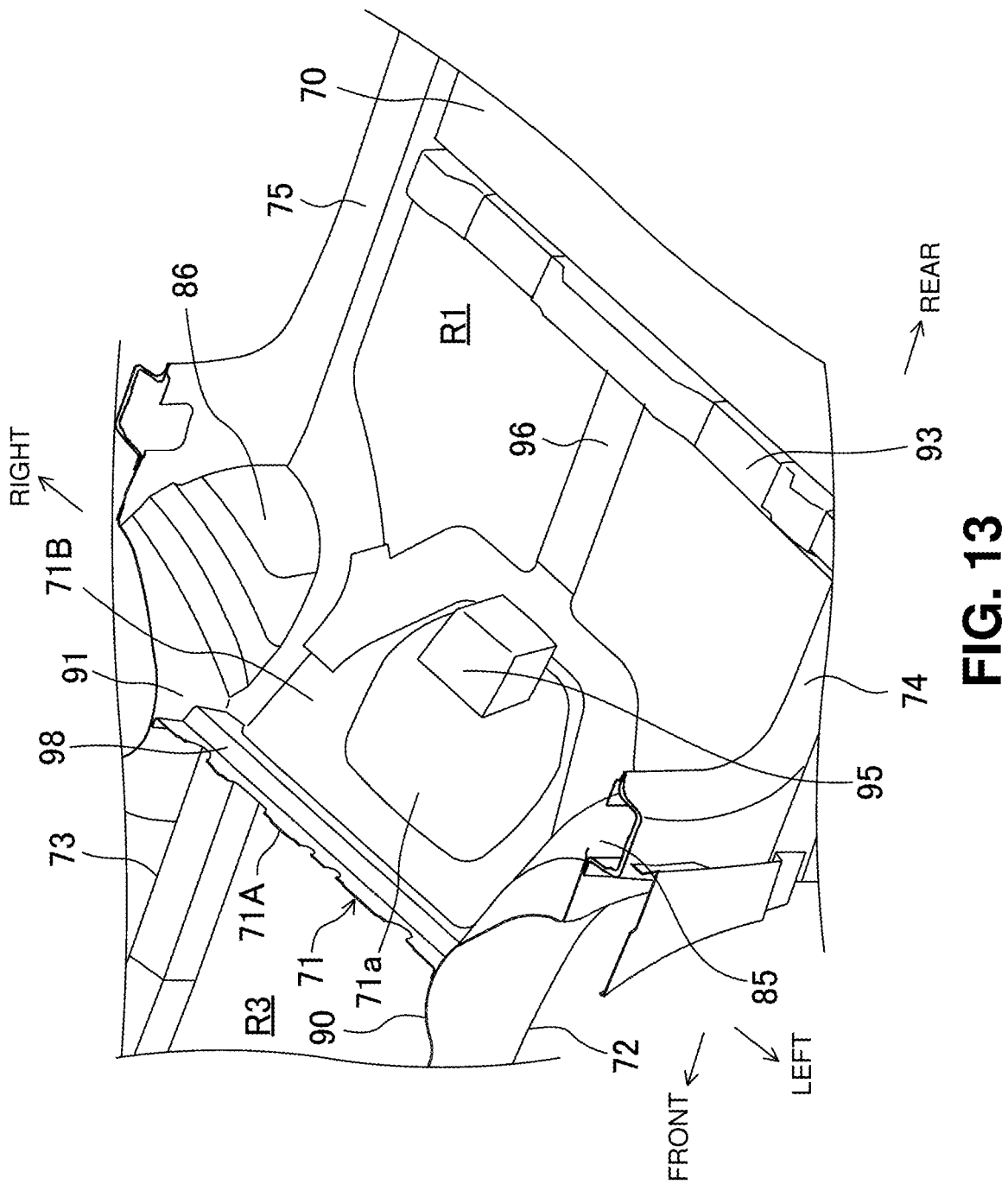
FIG. 13 is a perspective view illustrating an inside of a vehicle cabin in a state where the reinforcement member is detached.

In the present embodiment, as illustrated in FIG. 11 and FIG. 13, a connecting member 95, which couples the front portion of the reinforcement member 94 and a front portion of the floor reinforcement 96 together in the up-down direction, is provided in the rear of the motor arrangement portion 71a. The front portion of the reinforcement member 94 and the front portion of the floor reinforcement 96 are fixed to the connecting member 95 by fastening members. The connecting member 95 is formed by shaping a plate material, for example, and is a member which configures a part of the motor arrangement portion 71a. In other words, the motor arrangement portion 71a has a main body portion formed with the bulging portion and the connecting member 95. Note that, not via the connecting member 95, the front portion of the reinforcement member 94 may directly be fixed to a rear portion of a main body portion of the motor arrangement portion 71*a*.

In the present embodiment, because the connecting member 95 serves as a member which configures a part of the motor arrangement portion 71*a*, the front portion of the floor reinforcement 96 is connected with the lower portion of the motor arrangement portion 71*a*. Accordingly, because the front portion of the floor reinforcement 96 and the front portion of the reinforcement member 94 are respectively connected with portions, which are spaced apart in the up-down direction, of the motor arrangement portion 71*a*, rigidity of the motor arrangement portion 71*a* can be enhanced in a wide range.

Further, the rear portion of the reinforcement member 94 is connected with a rear portion of the floor reinforcement 96. Consequently, as illustrated in FIG. 10, a first closed cross-section is configured with the motor arrangement portion 71*a*, the reinforcement member 94 which extends rearward from the upper portion of the motor arrangement portion 71*a* while being inclined downward, and the floor reinforcement 96 which extends in the front-rear direction. The first closed cross-section is in a triangular shape in a side view, and its dimension in the up-down direction becomes shorter toward the rear.

Further, as illustrated in FIG. 10, the connecting member 95 is formed to extend rearward from an upper-side rear portion of the main body portion of the motor arrangement portion 71*a* and to then extend downward. Furthermore, an upper portion of the connecting member 95 is connected with the upper-side rear portion of the main body portion of the motor arrangement portion 71*a*, and a lower portion of the connecting member 95 is connected with a lower-side rear portion of the main body portion of the motor arrangement portion 71*a*. Accordingly, a second closed cross-section is configured with the connecting member 95 and the main body portion of the motor arrangement portion 71*a* in a side view. The second closed cross-section is in a shape close to a rectangle and is positioned in front of the first closed cross-section. The second closed cross-section is not necessarily required and may be configured in accordance with necessity.

Note that in the above present embodiment, the connecting member 95 is a member which configures a part of the motor arrangement portion 71*a*, but this is not restrictive, and the motor arrangement portion 71*a* may be configured only with the bulging portion. In this case, the front portion of the reinforcement member 94 is directly fixed to a rear portion of the motor arrangement portion 71*a*, and the first closed cross-section is configured with the motor arrangement portion 71*a*, the reinforcement member 94, and the floor reinforcement 96. Further, the connecting member 95 is fixed to a rear portion of the bulging portion configuring the motor arrangement portion 71*a*, and the second closed cross-section is thereby configured with the connecting member 95 and the motor arrangement portion 71*a*.

Figure 12:
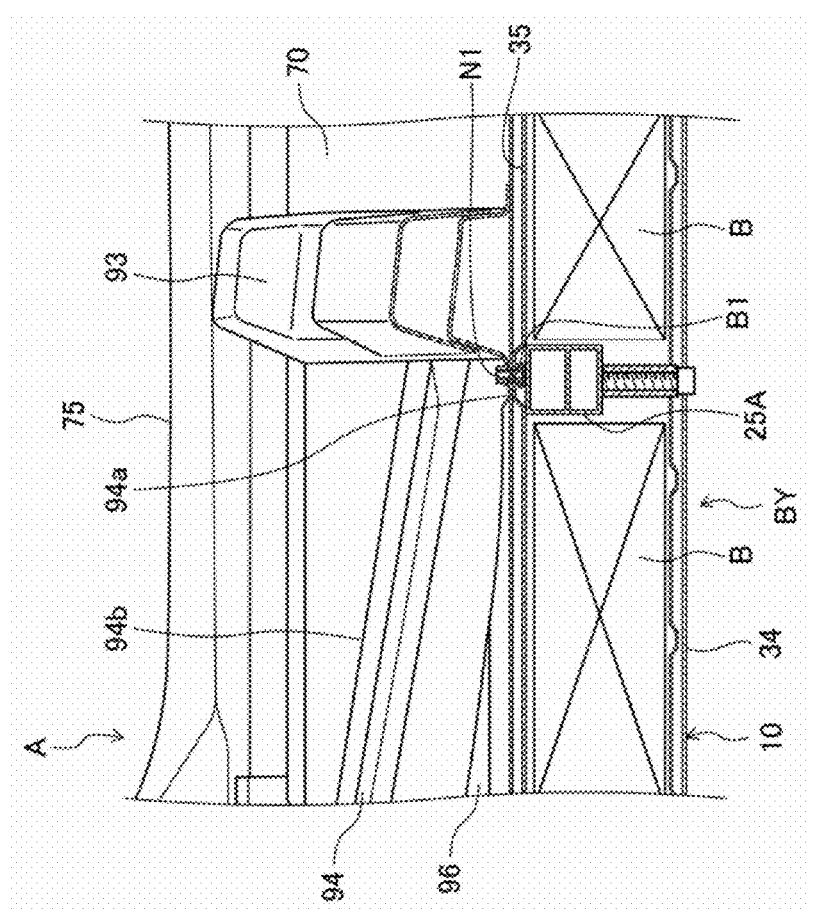
FIG. 12 is a cross-sectional view illustrating a structure example where the reinforcement member is mounted on a lid body of a battery unit.

As illustrated in FIG. 12, the rear portion of the reinforcement member 94 is mounted on the floor panel 70 and the lid body 35 of the battery unit BY. Specifically, a flange 94*a* which extends outward in the vehicle width direction is formed in the rear portion of the reinforcement member 94, and a bolt B1 passes through the flange 94*a*. On an upper surface of the flange 94*a*, a nut N1 into which the bolt B1 is screwed is fixed. The bolt B1 passes through a portion directly below the flange 94*a* in the lid body 35 and a portion directly below the flange 94*a* in the floor panel 70. The bolt B1 is caused to pass through the lid body 35, the floor panel 70, and the flange 94*a* from a portion below the lid body 35 and is screwed into the nut N1, and the rear portion of the reinforcement member 94 can thereby be fixed to the floor panel 70 and the lid body 35. In such a manner, the rear portion of the reinforcement member 94, the floor panel 70, and the lid body 35 are fastened together by the shared fastening members B1 and N1 and can thus firmly be integrated together. Note that the bolt B1 may be caused to pass through the flange 94*a* from above and may thereby be screwed into the nut N1 fixed to a lower surface of the lid body 35. Instead of the bolt B1, a screw or the like may be used. Further, plural parts of the reinforcement member 94 which are spaced apart in the vehicle width direction can also be mounted on the lid body 35 and the floor panel 70.

As illustrated in FIG. 10, the rear portion of the reinforcement member 94 is also mounted on a central portion of the first inside-casing member 25A in the vehicle width direction. Specifically, a bolt B2 passes through a portion of the flange 94*a* in the rear portion of the reinforcement member 94, the portion being spaced apart from the flange 94*a* (illustrated in FIG. 12) in the vehicle width direction. Further, the bolt B2 also passes through the floor reinforcement 96, the floor panel 70, and the lid body 35. To the rear portion of the reinforcement member 94, a nut N2 is fixed so as to agree with a through portion of the bolt B2.

An inserting hole 25*a* of the bolt B2 is formed in the first inside-casing member 25A. The bolt B2 inserted into the inserting hole 25*a* from below is caused to pass through, in order, an upper wall portion of the first inside-casing member 25A, the lid body 35, the floor panel 70, the floor reinforcement 96, and the rear portion of the reinforcement member 94 and is then screwed into the nut N2, and the rear portion of the reinforcement member 94 can thereby also be fastened to the first inside-casing member 25A. In such a manner, the rear portion of the reinforcement member 94, the floor reinforcement 96, the floor panel 70, the lid body 35, and the first inside-casing member 25A are fastened together by the shared fastening members B2 and N2 and can thus firmly be integrated together. Note that the bolt B2 may be caused to pass through the rear portion of the reinforcement member 94 from above and may thereby be screwed into the nut N2 fixed to the first inside-casing member 25. Instead of the bolt B2, a screw or the like may be used. Further, plural parts of the reinforcement member 94 which are spaced apart in the vehicle width direction can also be mounted on the first inside-casing member 25A.

For example, as illustrated in FIG. 3, the central portion in the first inside-casing member 25A in the vehicle width direction is an intersecting portion with the front central member 26 and is also an intersecting portion with the first rear central member 27. The intersecting portion with the front central member 26 (or the first rear central member 27) in the first inside-casing member 25A is reinforced by the front central member 26 (or the first rear central member 27) and is a portion with particularly high strength. On this portion with high strength, the rear portion of the reinforcement member 94 can be mounted.

Further, the rear portion of the reinforcement member 94 may be mounted on the front-side cross member 93. For example, the rear portion of the reinforcement member 94 may be fixed to an upper portion of the front-side cross member 93 by fastening members, or the rear portion of the reinforcement member 94 may be fixed to the front-side cross member 93 via a bracket.

Based on FIG. 8, the positional relationship between the reinforcement member 94 and the batteries B will be described. When positions of front portions of the batteries B disposed foremost among plural batteries B included in the battery unit BY are compared to a position of the front portion of the reinforcement member 94, the batteries B are arranged such that the front portions of the batteries B disposed foremost are positioned in the rear of the front portion of the reinforcement member 94. Accordingly, an impact load from front in a collision is less likely to be exerted on the batteries B.

Further, at least a part of the front-side traveling motor M1 is positioned so as to overlap with at least the front portion of the reinforcement member 94 in a front view. For example, as illustrated in FIG. 7, a position of the front-side traveling motor M1 in the up-down direction is set generally the same as a position of the front portion of the reinforcement member 94 in the up-down direction. Accordingly, when the front-side traveling motor M1 retreats, its load can certainly be received by the front portion of the reinforcement member 94.

Figure 15:
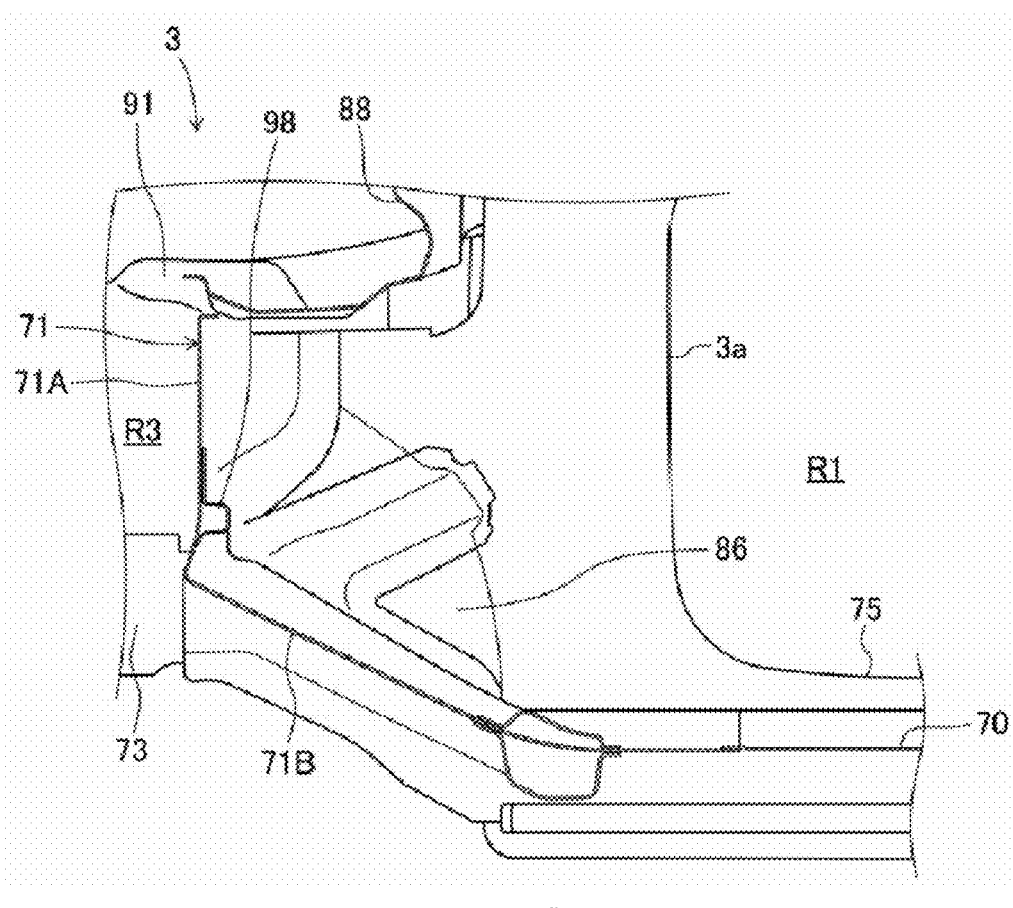
FIG. 15 is a cross-sectional view which illustrates the upper structure from which batteries and so forth are omitted and which corresponds to line XV-XV in FIG. 9.

As illustrated in FIG. 13, FIG. 15, and so forth, the upper structure 3 includes a partition wall reinforcement member 98. The partition wall reinforcement member 98 is provided in front of the motor arrangement portion 71a in a surface of the upper-side panel portion 71A on the inside of the vehicle cabin R1 and extends in the vehicle width direction. A front portion of the partition wall reinforcement member 98 is joined to the lower-side panel portion 71B. A left end portion of the partition wall reinforcement member 98 is connected with the left suspension tower portion 90, and a right end portion of the partition wall reinforcement member 98 is connected with the right suspension tower portion 91.

Working Effects of Embodiments

As described above, because the motor arrangement portion 71a is formed by causing the lower-side portion of the dash panel 71 to bulge to the inside of the vehicle cabin R1 and the front-side traveling motor M1 is arranged in the motor arrangement portion 71a, it becomes possible to cause the front-side traveling motor M1 to be close to the rear side. Accordingly, a crash stroke in a collision is sufficiently secured in the front-rear direction.

Next, a description will be made about a collision of the electric vehicle 1 which is configured as described above. In a collision in which an impact load is exerted from front, an obstacle possibly enters the power chamber R3 which is formed in front of the dash panel 71, and the obstacle exerts a load in a retreating direction on the front-side traveling motor M1. The front-side traveling motor M1 on which the load in the retreating direction is exerted pushes rearward the motor arrangement portion 71a, but because the motor arrangement portion 71a is coupled with the front-side cross member 93 with high rigidity by the reinforcement member 94, rearward deformation of the motor arrangement portion 71a is inhibited. Accordingly, retreat of the front-side traveling motor M1 to the inside of the vehicle cabin R1 is inhibited.

Further, because the front portions of the batteries B are arranged in the rear of the front portion of the reinforcement member 94, an impact load in a collision is less likely to be exerted on the batteries B.

Further, because at least a part of the front-side traveling motor M1 is positioned so as to overlap with the front portion of the reinforcement member 94 in a front view, when the front-side traveling motor M1 retreats, its load can certainly be received by the front portion of the reinforcement member 94 and can be transmitted to the front-side cross member 93.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

INDUSTRIAL APPLICABILITY

As described in the foregoing, a vehicle-body front structure according to the present disclosure can be provided to an electric vehicle, for example.

REFERENCE SIGNS LIST

1 electric vehicle
10 battery casing
32 front-side battery frame
70 floor panel
71 dash panel (partition wall portion)
71a motor arrangement portion
93 front-side cross member
94 reinforcement member
A vehicle-body front structure
B battery
M1 traveling motor
S1 front seat (seat)

The invention claimed is:
1. A vehicle-body front structure for an electric vehicle in which a traveling motor is installed in a vehicle front portion, the vehicle-body front structure comprising:
a partition wall portion which extends in a vehicle width direction in the vehicle front portion and separates a vehicle cabin inside space;

a motor arrangement portion which is a part of the partition wall portion, the motor arrangement portion bulges to an inside of the vehicle cabin inside space and at least a part of the traveling motor that is installed on an outside of the vehicle cabin inside space is arranged on the motor arrangement portion;

a cross structure which is fixed to a floor panel on a vehicle rear side of the motor arrangement portion and extends in the vehicle width direction; and a reinforcement structure which couples the motor arrangement portion and the cross structure together.

2. The vehicle-body front structure according to claim 1, wherein a battery which supplies electric power to the traveling motor is arranged, below the floor panel, rearward of a front portion of the reinforcement structure.

3. The vehicle-body front structure according to claim 2, wherein in a front view, at least a part of the traveling motor is positioned so as to overlap with a front portion of the reinforcement structure.

4. The vehicle-body front structure according to claim 3, wherein a battery casing housing the battery, a front-side battery frame which extends in the vehicle width direction is provided in a front portion of the battery casing, and in the front view, at least a part of the traveling motor is positioned so as to overlap with at least a part of the front-side battery frame.

5. The vehicle-body front structure according to claim 4, wherein a lower-side portion of the partition wall portion is formed to be positioned further to vehicle rear toward a lower position, and the traveling motor is installed in the motor arrangement portion which is formed in the lower-side portion of the partition wall portion.

6. The vehicle-body front structure according to claim 5, wherein at least a part of a seat which is disposed in the vehicle cabin inside space is mounted on the cross structure.

7. The vehicle-body front structure according to claim 1, wherein in a front view, at least a part of the traveling motor is positioned so as to overlap with a front portion of the reinforcement structure.

8. The vehicle-body front structure according to claim 1, wherein a battery casing housing a battery supplying electric power to the traveling motor is disposed below the floor panel, a front-side battery frame which extends in the vehicle width direction is provided in a front portion of the battery casing, and in a front view, at least a part of the traveling motor is positioned so as to overlap with at least a part of the front-side battery frame.

9. The vehicle-body front structure according to claim 1, wherein a lower-side portion of the partition wall portion is formed to be positioned further to vehicle rear toward a lower position, and the traveling motor is installed in the motor arrangement portion which is formed in the lower-side portion of the partition wall portion.

10. The vehicle-body front structure according to claim 1, wherein at least a part of a seat which is disposed in the vehicle cabin inside space is mounted on the cross structure.

11. The vehicle-body front structure according to claim 2, wherein a battery casing housing the battery, a front-side battery frame which extends in the vehicle width direction is provided in a front portion of the battery casing, and in a front view, at least a part of the traveling motor is positioned so as to overlap with at least a part of the front-side battery frame.

12. The vehicle-body front structure according to claim 2, wherein a lower-side portion of the partition wall portion is formed to be positioned further to vehicle rear toward a lower position, and the traveling motor is installed in the motor arrangement portion which is formed in the lower-side portion of the partition wall portion.

13. The vehicle-body front structure according to claim 2, wherein at least a part of a seat which is disposed in the vehicle cabin inside space is mounted on the cross structure.

14. The vehicle-body front structure according to claim 3, wherein a lower-side portion of the partition wall portion is formed to be positioned further to vehicle rear toward a lower position, and the traveling motor is installed in the motor arrangement portion which is formed in the lower-side portion of the partition wall portion.

15. The vehicle-body front structure according to claim 3, wherein at least a part of a seat which is disposed in the vehicle cabin inside space is mounted on the cross structure.

16. The vehicle-body front structure according to claim 4, wherein at least a part of a seat which is disposed in the vehicle cabin inside space is mounted on the cross structure.

* * * * *